(12) United States Patent
Nakayama et al.

(10) Patent No.: US 11,117,352 B2
(45) Date of Patent: *Sep. 14, 2021

(54) LAMINATED-GLASS INTERLAYER AND LAMINATED GLASS

(71) Applicant: SEKISUI CHEMICAL CO., LTD., Osaka (JP)

(72) Inventors: Kazuhiko Nakayama, Kouka (JP); Kouhei Yamaguchi, Kouka (JP); Juichi Fukatani, Osaka (JP); Yasuyuki Izu, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,079

(22) Filed: Nov. 6, 2019

(65) Prior Publication Data

US 2020/0070479 A1 Mar. 5, 2020

Related U.S. Application Data

(63) Continuation of application No. 14/442,558, filed as application No. PCT/JP2013/080814 on Nov. 14, 2013, now Pat. No. 10,513,092.

(30) Foreign Application Priority Data

Nov. 14, 2012 (JP) ................................. 2012-250437

(51) Int. Cl.
*B32B 17/10* (2006.01)
*B32B 3/26* (2006.01)
*C03C 27/10* (2006.01)

(52) U.S. Cl.
CPC .......... *B32B 17/1066* (2013.01); *B32B 3/263* (2013.01); *B32B 17/10036* (2013.01);
(Continued)

(58) Field of Classification Search
CPC ........ B32B 17/10036; B32B 17/10357; B32B 17/10559; B32B 17/10568;
(Continued)

(56) References Cited

U.S. PATENT DOCUMENTS 3,354,025 A 11/1967 Ardashus et al.
3,922,456 A 11/1975 Baldridge
(Continued)

FOREIGN PATENT DOCUMENTS

CN 101038349 A 9/2007
CN 101180764 A 5/2008
(Continued)

OTHER PUBLICATIONS

International Search Report for the Application No. PCT/JP2013/080814 dated Feb. 25, 2014.
(Continued)

*Primary Examiner* — Alicia J Sawdon
(74) *Attorney, Agent, or Firm* — Cheng Law Group, PLLC

(57) ABSTRACT

There is provided an interlayer film for laminated glass with which laminated glass having a gradation pattern with suppressed color irregularity can be prepared. The interlayer film for laminated glass according to the present invention is provided with a dark color part, a gradation part and a transparent part, allows laminated glass prepared with two sheets of clear glass to have a parallel light transmittance in a portion of the dark color part less than or equal to 30%, allows the parallel light transmittance in a portion of the gradation part to be continuously increased from the dark color part side to the transparent part side, allows the laminated glass to have a parallel light transmittance in a portion of the transparent part greater than or equal to 60%, allows each of the dark color part, the gradation part and the
(Continued)

transparent part to have a first resin layer and allows each of the dark color part and the gradation part to have a second resin layer or allows each of the dark color part, the gradation part and the transparent part to have a second resin layer and allows each of the gradation part and the transparent part to have a first resin layer, and furthermore, allows the thickness of the second resin layer in the gradation part to be continuously decreased from the dark color part side to the transparent part side.

10 Claims, 5 Drawing Sheets

(52) U.S. Cl.
CPC .. *B32B 17/10357* (2013.01); *B32B 17/10559* (2013.01); *B32B 17/10568* (2013.01); *B32B 17/10623* (2013.01); *B32B 17/10761* (2013.01); *C03C 27/10* (2013.01); *B32B 2250/05* (2013.01); *B32B 2250/40* (2013.01); *B32B 2307/4026* (2013.01); *B32B 2605/006* (2013.01)

(58) Field of Classification Search
CPC .......... B32B 17/10623; B32B 17/1066; B32B 17/10678; B32B 17/10761; B32B 2250/05; B32B 2250/40; B32B 2307/4026; B32B 2605/006; B32B 3/263
See application file for complete search history.

(56) References Cited

U.S. PATENT DOCUMENTS

| | | | |
|---|---|---|---|
| 4,943,140 | A | 7/1990 | Woodard et al. |
| 6,159,608 | A | 12/2000 | Friedman et al. |
| 2002/0039649 | A1 | 4/2002 | Nagai |
| 2004/0166288 | A1 | 8/2004 | Travis et al. |
| 2007/0148472 | A1 | 6/2007 | Masaki et al. |
| 2007/0231584 | A1 | 10/2007 | Hasegawa |
| 2007/0269639 | A1 | 11/2007 | Travis et al. |
| 2008/0014414 | A1 | 1/2008 | Yacovone |
| 2008/0075923 | A1 | 3/2008 | Travis et al. |
| 2008/0176043 | A1 | 7/2008 | Masaki et al. |
| 2009/0047506 | A1 | 2/2009 | Jiang et al. |
| 2009/0051620 | A1 | 2/2009 | Ishibashi et al. |
| 2009/0140938 | A1 | 6/2009 | Ishibashi et al. |
| 2010/0043946 | A1 | 2/2010 | Ogino et al. |
| 2011/0287265 | A1 | 11/2011 | Hasegawa |
| 2012/0164409 | A1 | 6/2012 | Masaki |
| 2012/0228796 | A1 | 9/2012 | Ogino et al. |

FOREIGN PATENT DOCUMENTS

| | | | |
|---|---|---|---|
| CN | 101367624 | A | 2/2009 |
| CN | 102471153 | A | 5/2012 |
| EP | 1 800 855 | A1 | 6/2007 |
| EP | 1 958 764 | A1 | 8/2008 |
| EP | 2 465 833 | A1 | 6/2012 |
| JP | 3-115142 | A | 5/1991 |
| JP | 8-26785 | A | 1/1996 |
| JP | 2004-536009 | A | 12/2004 |
| JP | 2007-223883 | A | 9/2007 |
| JP | 2008-1535 | A | 1/2008 |
| JP | 2008-201667 | A | 9/2008 |
| WO | WO-2006/082800 | A1 | 8/2006 |
| WO | WO-2009/001856 | A1 | 12/2008 |
| WO | WO-2011/019062 | A1 | 2/2011 |

OTHER PUBLICATIONS

International Preliminary Report on Patentability (PCT/IPEA/409) for Application No. PCT/JP2013/080814 dated Jan. 7, 2015 (English Translation mailed May 14, 2015).
Supplementary European Search Report for the Application No. EP 13 85 5582 dated Jun. 3, 2016.
The First Office Action for Application No. 201380059489.3 from The State Intellectual Property Office of the People's Republic of China dated Nov. 28, 2016.
The First Office Action for the Application No. 201910275143.6 from The State Intellectual Property Office of the People's Republic of China dated Apr. 13, 2021.
The First Office Action for the Application No. 201910275061.1 from The State Intellectual Property Office of the People's Republic of China dated Jun. 21, 2021.

[FIG. 1]
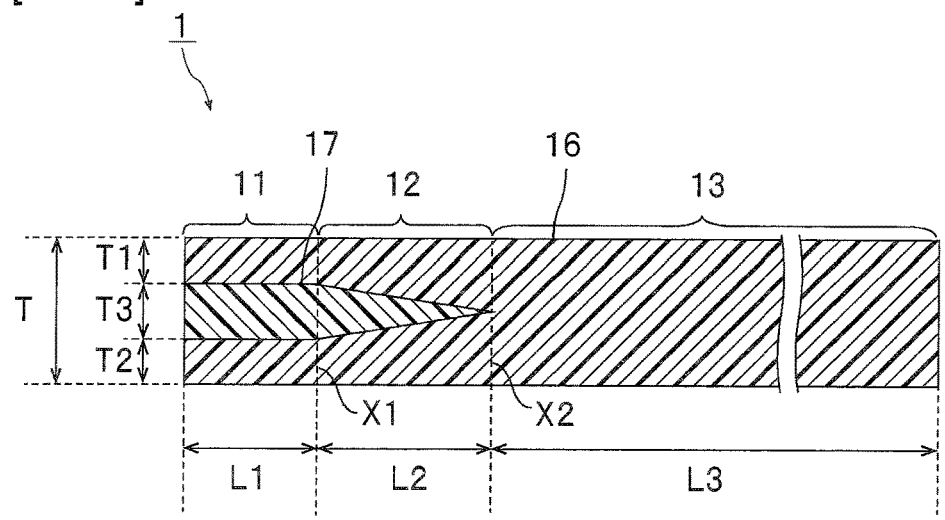
[FIG. 2]
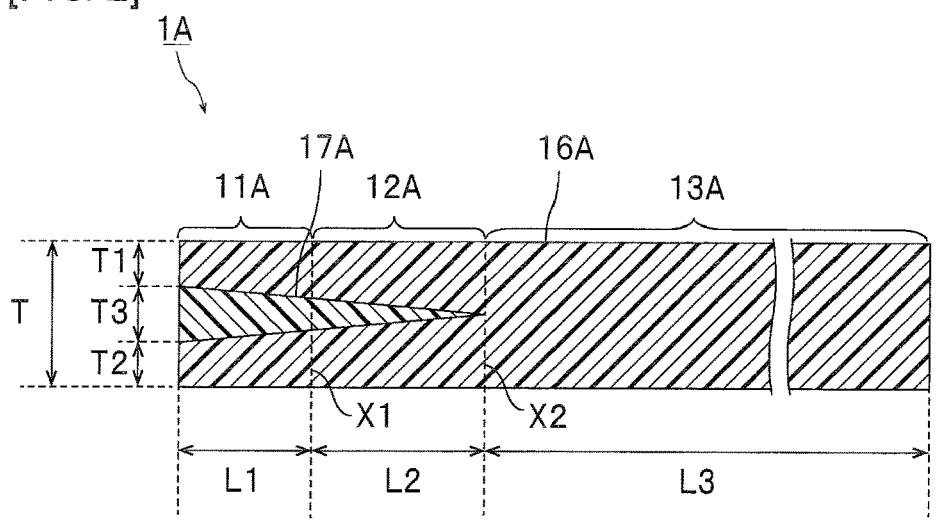
[FIG. 3]
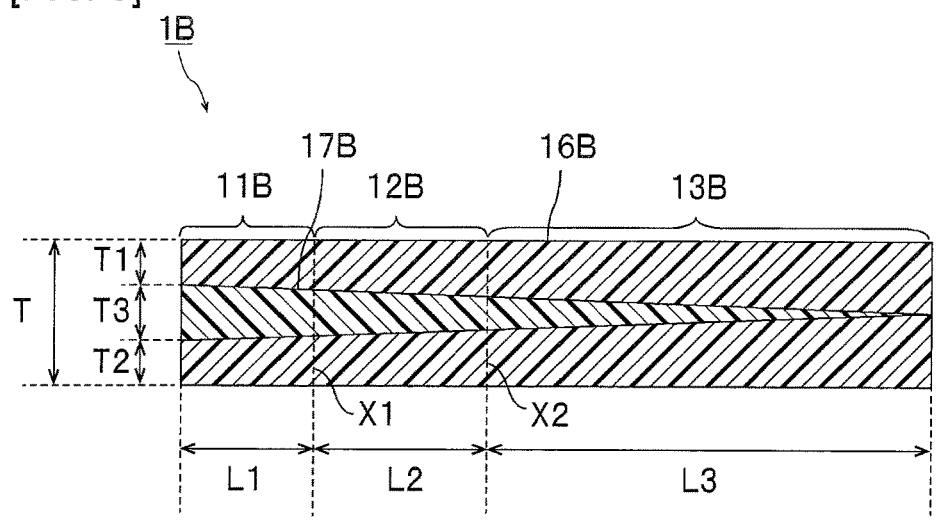

[FIG. 4]
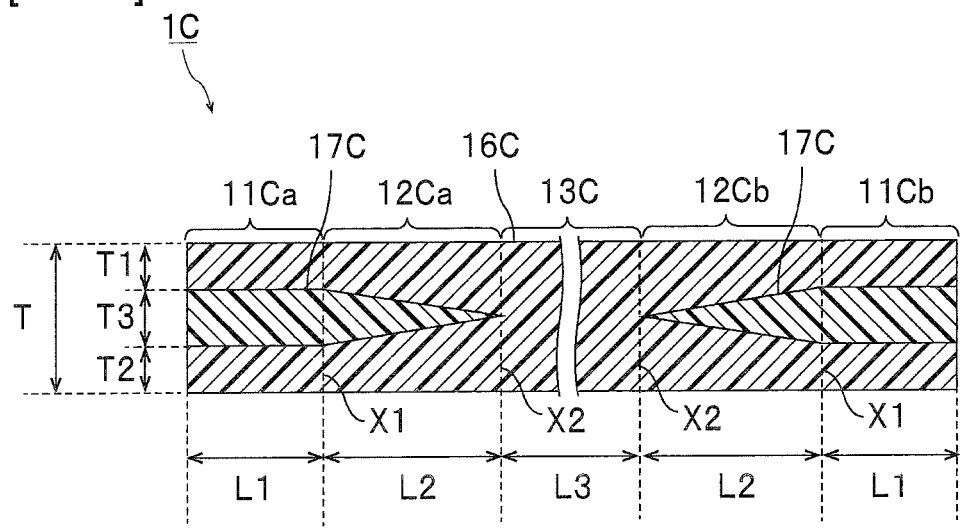
[FIG. 5]
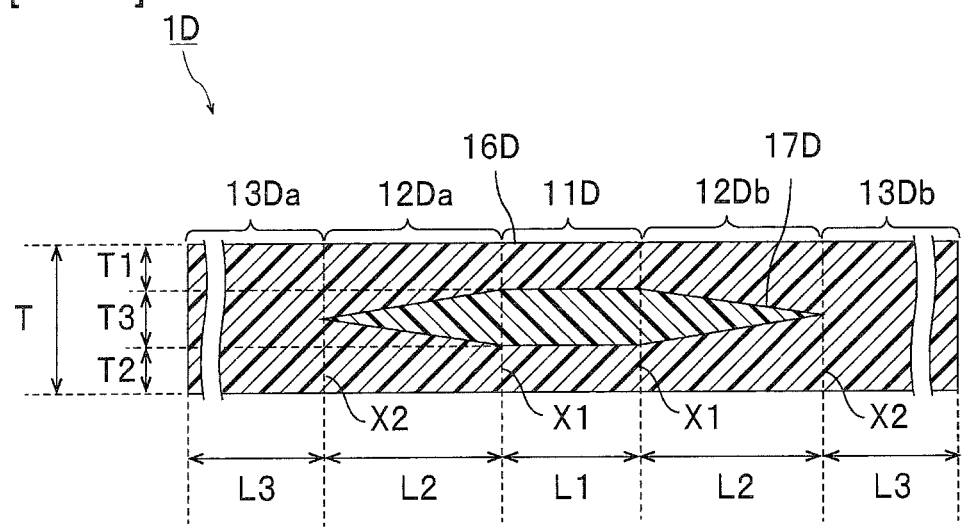

[FIG. 6]
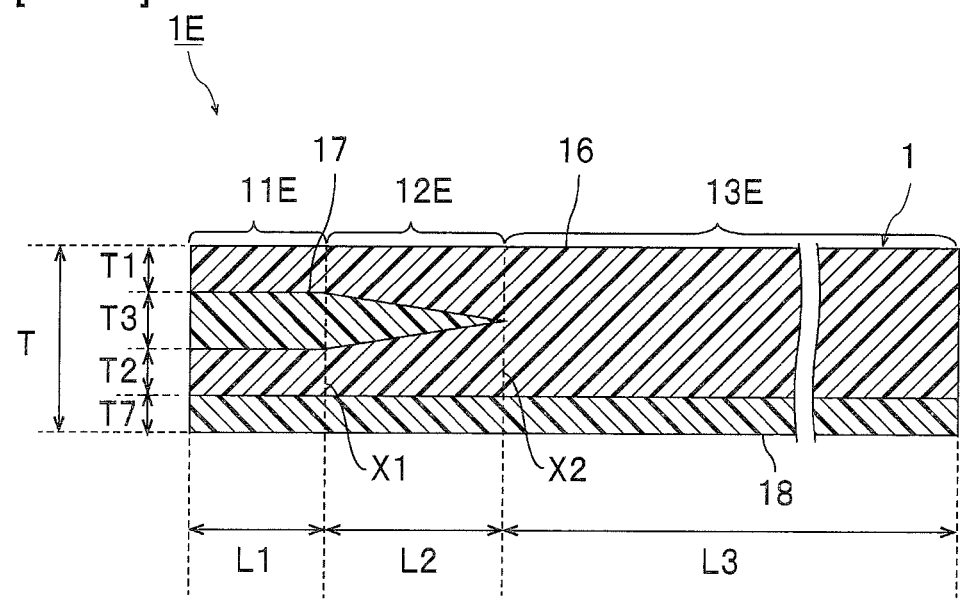
[FIG. 7]
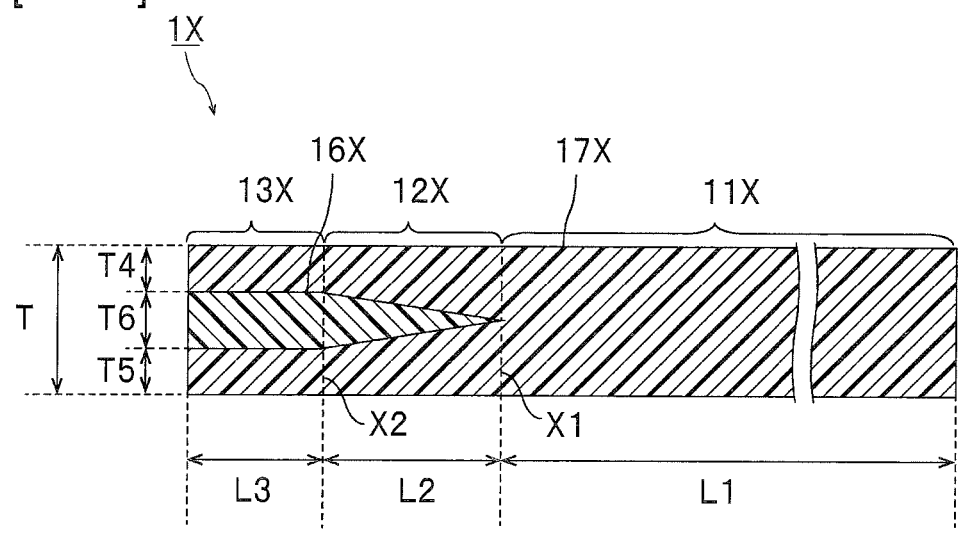

[FIG. 8]
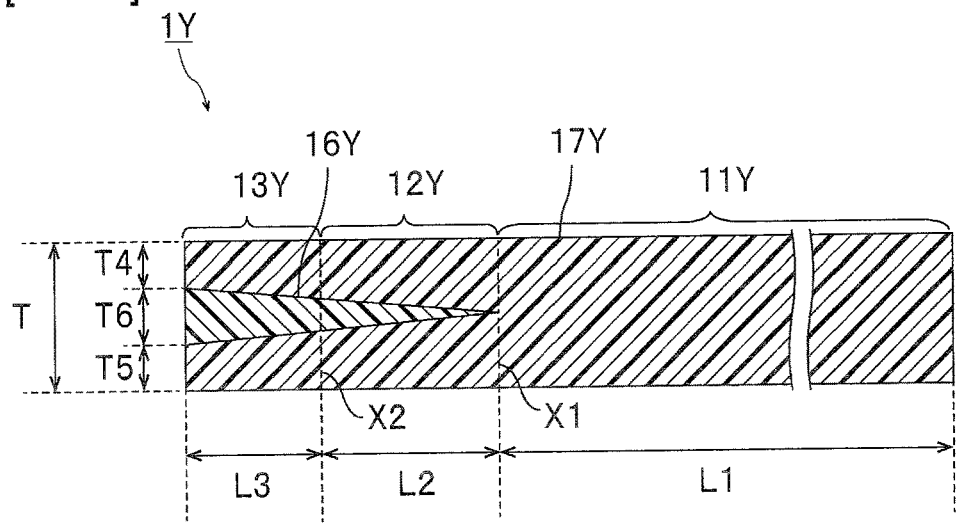
[FIG. 9]
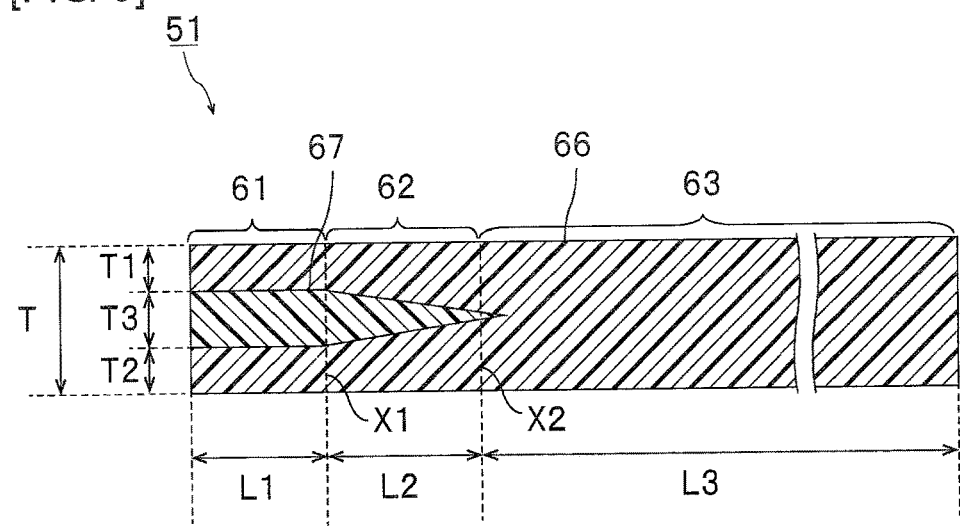
[FIG. 10]
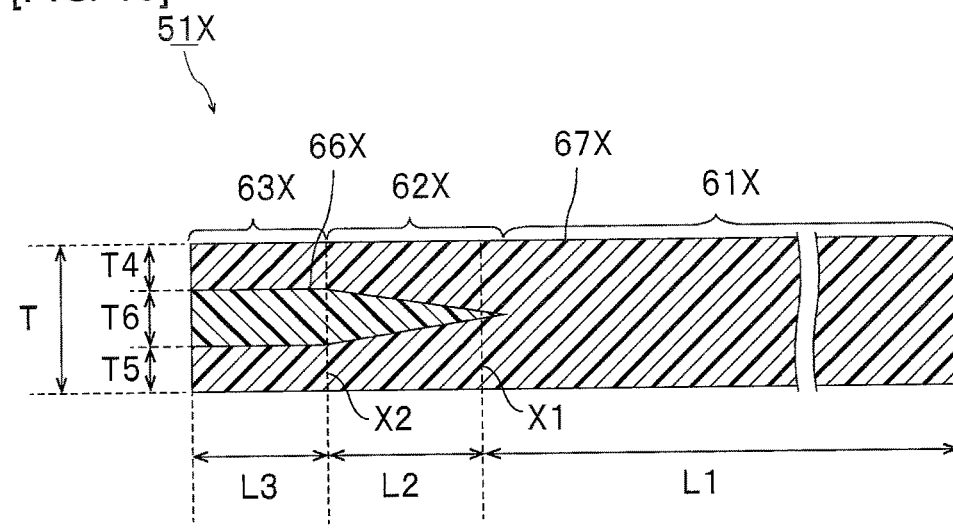

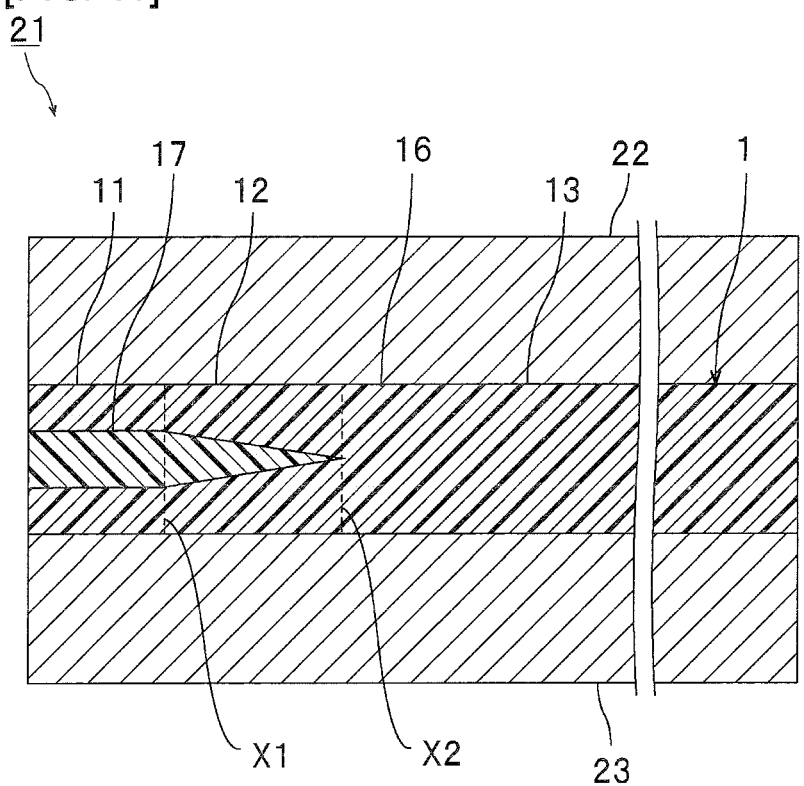
[FIG. 11]

LAMINATED-GLASS INTERLAYER AND LAMINATED GLASS

CROSS-REFERENCE TO RELATED APPLICATIONS

This application is a Continuation Application of patent application Ser. No. 14/442,558, filed on May 13, 2015, which is a 371 application of Application Serial No. PCT/JP2013/080814, filed on Nov. 14, 2013, which is based on Japanese Patent Application No. 2012-250437 filed Nov. 14, 2012, the entire contents of which are hereby incorporated by reference.

TECHNICAL FIELD

The present invention relates to an interlayer film for laminated glass partially having a gradation pattern. Moreover, the present invention relates to laminated glass prepared with the interlayer film for laminated glass.

BACKGROUND ART

Laminated glass in which an interlayer film for laminated glass is sandwiched between a pair of glass plates has been known. This laminated glass is widely used for automobiles, railway vehicles, aircraft, ships, buildings and the like. In recent years, as laminated glass for construction, there has been a demand for laminated glass having a privacy protection property. For example, although the laminated glass having a privacy protection property can transmit light, it is impossible to visually recognize a person or an object positioned behind the laminated glass.

As an example of laminated glass having a privacy protection property, the following Patent Document 1 discloses laminated glass prepared With a multilayer interlayer film having an opaque layer. In this laminated glass, by adopting the opaque layer precluding a person or an object positioned behind the laminated glass from being visually recognized, the privacy protection property is realized.

Related Art Document

Patent Document

Patent Document 1: WO 2006/082800 A1

SUMMARY OF THE INVENTION

Problems to be Solved by the Invention

Due to diversification of applications of laminated glass for construction, there has been a demand for laminated glass having an appearance design property of a gradation pattern with suppressed color irregularity in addition to a privacy protection property. Since the color of the laminated glass disclosed in Patent Document 1 is uniform over the whole face of the glass, there is a problem that the appearance design property is An object of the present invention is to provide an interlayer film for laminated glass with which laminated glass having a gradation pattern with suppressed color irregularity as well as having an excellent privacy protection property can be prepared, and laminated glass prepared with the interlayer film for laminated glass.

Means for Solving the Problems

According to a broad aspect of the present invention, there is provided an interlayer film for laminated glass, being provided with a dark color part, a gradation part and a transparent part, the dark color part, the gradation part and the transparent part being arranged side by side in the direction orthogonal to the thickness direction in this order, allowing laminated glass to have a parallel light transmittance in a portion of the dark color part less than or equal to 30% at the time of preparing the laminated glass with two sheets of clear glass in accordance with JIS R3202 (1996), allowing the parallel light transmittance in a portion of the gradation part of the laminated glass to be continuously increased from the dark color part side to the transparent part side, and allowing the laminated glass to have a parallel light transmittance in a portion of the transparent part greater than or equal to 60%, including the following first configuration or including the following second configuration.

The first configuration: Each of the dark color part, the gradation part and the transparent part has a first resin layer containing a thermoplastic resin and a plasticizer, each of the dark color part and the gradation part further has a second resin layer being embedded in the first resin layer so as to allow the first resin layer to be situated on surfaces at both sides in the thickness direction and containing a thermoplastic resin, a plasticizer and inorganic particles, and the thickness of the second resin layer in the gradation part is continuously decreased from the dark color part side to the transparent part side so as to allow the parallel light transmittance in a portion of the gradation part of the laminated glass to be continuously increased from the dark color part side to the transparent part side.

The second configuration: Each of the dark color part, the gradation part and the transparent part has a second resin layer containing a thermoplastic resin, a plasticizer and inorganic particles, each of the gradation part and the transparent part further has a first resin layer being embedded in the second resin layer so as to allow the second resin layer to be situated on surfaces at both sides in the thickness direction and containing a thermoplastic resin and a plasticizer, and the total thickness of the second resin layers in the gradation part is continuously decreased from the dark color part side to the transparent part side so as to allow the parallel light transmittance in a portion of the gradation part of the laminated glass to be continuously increased from the dark color part side to the transparent part side.

According to a broad aspect of the present invention, there is provided an interlayer film for laminated glass (a first interlayer film for laminated glass including the above-mentioned first configuration), being provided with a dark color part, a gradation part and a transparent part, the dark color part, the gradation part and the transparent part being arranged side by side in the direction orthogonal to the thickness direction in this order, allowing laminated glass to have a parallel light transmittance in a portion of the dark color part less than or equal to 30% at the time of preparing the laminated glass with two sheets of clear glass in accordance with JIS R3202 (1996), allowing the parallel light transmittance in a portion of the gradation part of the laminated glass to be continuously increased from the dark color part side to the transparent part side, and allowing the laminated glass to have a parallel light transmittance in a portion of the transparent part greater than or equal to 60%, wherein each of the dark color part, the gradation part and the transparent part has a first resin layer containing a thermoplastic resin and a plasticizer, each of the dark color part and the gradation part further has a second resin layer being embedded in the first resin layer so as to allow the first resin layer to be situated on surfaces at both sides in the thickness direction and containing a thermoplastic resin, a plasticizer and inorganic particles, and the thickness of the second resin layer in the gradation part is continuously decreased from the dark color part side to the transparent part side so as to allow the parallel light transmittance in a portion of the gradation part of the laminated glass to be continuously increased from the dark color part side to the transparent part side.

According to a broad aspect of the present invention, there is provided an interlayer film for laminated glass (a second interlayer film for laminated glass including the above-mentioned second configuration), being provided with a dark color part, a gradation part and a transparent part, the dark color part, the gradation part and the transparent part being arranged side by side in the direction orthogonal to the thickness direction in this order, allowing laminated glass to have a parallel light transmittance in a portion of the dark color part less than or equal to 30% at the time of preparing the laminated glass with two sheets of clear glass in accordance with JIS R3202 (1996), allowing the parallel light transmittance in a portion of the gradation part of the laminated glass to be continuously increased from the dark color part side to the transparent part side, and allowing the laminated glass to have a parallel light transmittance in a portion of the transparent part greater than or equal to 60%, wherein each of the dark color part, the gradation part and the transparent part has a second resin layer containing a thermoplastic resin, a plasticizer and inorganic particles, each of the gradation part and the transparent part further has a first resin layer being embedded in the second resin layer so as to allow the second resin layer to be situated on surfaces at both sides in the thickness direction and containing a thermoplastic resin and a plasticizer, and the total thickness of the second resin layers in the gradation part is continuously decreased from the dark color part side to the transparent part side so as to allow the parallel light transmittance in a portion of the gradation part of the laminated glass to be continuously increased from the dark color part side to the transparent part side.

In a specific aspect of the interlayer film for laminated glass according to the present invention, the complex viscosity at 200° C. of the second resin layer is greater than or equal to 0.7 times and less than or equal to 2 times the complex viscosity at 200° C. of the first resin layer.

According to a broad aspect of the present invention, there is provided laminated glass including a first laminated glass member, a second laminated glass member and the interlayer film for laminated glass described above, wherein the interlayer film for laminated glass is arranged between the first laminated glass member and the second laminated glass member.

Effect of the Invention

Since the interlayer film for laminated glass according to the present invention is provided with a dark color part, a gradation part and a transparent part, allows the dark color part, the gradation part and the transparent part to be arranged side by side in the direction orthogonal to the thickness direction in this order, allows laminated glass to have a parallel light transmittance in a portion of the dark color part less than or equal to 30% at the time of preparing the laminated glass with two sheets of clear glass in accordance with JIS R3202 (1996), allows the parallel light transmittance in a portion of the gradation part of the laminated glass to be continuously increased from the dark color part side to the transparent part side, and allows the laminated glass to have a parallel light transmittance in a portion of the transparent part greater than or equal to 60%, and furthermore, the interlayer film for laminated glass according to the present invention includes the first configuration described above or the second configuration described above, it is possible to obtain laminated glass having a gradation pattern with suppressed color irregularity as well as having an excellent privacy protection property.

BRIEF DESCRIPTION OF DRAWINGS

FIG. 1 is a cross-sectional view showing an interlayer film for laminated glass in accordance with the first embodiment of the present invention.

FIG. 2 is a cross-sectional view showing an interlayer film for laminated glass in accordance with the second embodiment of the present invention.

FIG. 3 is a cross-sectional view showing an interlayer film for laminated glass in accordance with the third embodiment of the present invention.

FIG. 4 is a cross-sectional view showing an interlayer film for laminated glass in accordance with the fourth embodiment of the present invention.

FIG. 5 is a cross-sectional view showing an interlayer film for laminated glass in accordance with the fifth embodiment of the present invention.

FIG. 6 is a cross-sectional view showing an interlayer film for laminated glass in accordance with the sixth embodiment of the present invention.

FIG. 7 is a cross-sectional view showing an interlayer film for laminated glass in accordance with the seventh embodiment of the present invention.

FIG. 8 is a cross-sectional view showing an interlayer film for laminated glass in accordance with the eighth embodiment of the present invention.

FIG. 9 is a cross-sectional view for illustrating another example of the boundary between the gradation part and the transparent part.

FIG. 10 is a cross-sectional view for illustrating another example of the boundary between the dark color part and the gradation part.

FIG. 11 is a cross-sectional view showing an example of laminated glass prepared with the interlayer film for laminated glass shown in FIG. 1.

MODE(S) FOR CARRYING OUT THE INVENTION

Hereinafter, the present invention will be described in detail.

The interlayer film for laminated glass according to the present invention includes the following main configuration.

Main configuration: The interlayer film for laminated glass is provided with a dark color part, a gradation part and a transparent part, allows the dark color part, the gradation part and the transparent part to be arranged side by side in the direction orthogonal to the thickness direction in this order, allows laminated glass to have a parallel light transmittance in a portion of the dark color part less than or equal to 30% at the time of preparing the laminated glass with two sheets of clear glass in accordance with JIS R3202 (1996), allows the parallel light transmittance in a portion of the gradation part of the laminated glass to be continuously increased from the dark color part side to the transparent part side, and allows the laminated glass to have a parallel light transmittance in a portion of the transparent part greater than or equal to 60%.

In addition to the foregoing main configuration, the interlayer film for laminated glass according to the present invention includes the following first configuration or the following second configuration.

The first configuration: Each of the dark color part, the gradation part and the transparent part has a first resin layer containing a thermoplastic resin and a plasticizer, each of the dark color part and the gradation part further has a second resin layer being embedded in the first resin layer so as to allow the first resin layer to be situated on surfaces at both sides in the thickness direction and containing a thermoplastic resin, a plasticizer and inorganic particles, and the thickness of the second resin layer in the gradation part is continuously decreased from the dark color part side to the transparent part side so as to allow the parallel light transmittance in a portion of the gradation part of the laminated glass to be continuously increased from the dark color part side to the transparent part side.

The second configuration: Each of the dark color part, the gradation part and the transparent part has a second resin layer containing a thermoplastic resin, a plasticizer and inorganic particles, each of the gradation part and the transparent part further has a first resin layer being embedded in the second resin layer so as to allow the second resin layer to be situated on surfaces at both sides in the thickness direction and containing a thermoplastic resin and a plasticizer, and the total thickness of the second resin layers in the gradation part is continuously decreased from the dark color part side to the transparent part side so as to allow the parallel light transmittance in a portion of the gradation part of the laminated glass to be continuously increased from the dark color part side to the transparent part side.

The interlayer film for laminated glass according to the present invention is a first interlayer film for laminated glass including the main configuration and the first configuration or a second interlayer film for laminated glass including the main configuration and the second configuration. The interlayer film for laminated glass according to the present invention may be the first interlayer film for laminated glass and may be the second interlayer film for laminated glass. It is preferred that the interlayer film for laminated glass according to the present invention be the first interlayer film for laminated glass.

In the first interlayer film for laminated glass, the second resin layer is embedded in the first resin layer so as to allow the first resin layer to be situated on surfaces at both sides in the thickness direction. In the second interlayer film for laminated glass, the first resin layer is embedded in the second resin layer so as to allow the second resin layer to be situated on surfaces at both sides in the thickness direction. The "surfaces at both sides" mean surfaces in a laminate of the first resin layer and the second resin layer. The "surfaces at both sides" may not be outermost surfaces of the interlayer film.

Hereinafter, the present invention will be elucidated by describing specific embodiments of the present invention with reference to the drawings.

FIG. 1 shows an interlayer film for laminated glass in accordance with the first embodiment of the present invention represented as a cross-sectional view.

The interlayer film 1 shown in FIG. 1 is used for obtaining laminated glass. The interlayer film 1 is an interlayer film for laminated glass. The interlayer film 1 is provided with a dark color part 11, a gradation part 12 and a transparent part 13. In the interlayer film 1, the dark color part 11, the gradation part 12 and the transparent part 13 are arranged side by side in the direction orthogonal to the thickness direction of the interlayer film 1 in this order. The interlayer film 1, and an interlayer film 1A, an interlayer film 1B, an interlayer film 10, an interlayer film 1D, an interlayer film 1E and an interlayer film 51 which are described below are the first interlayer films for laminated glass including the main configuration and the first configuration.

The interlayer film 1 and two sheets of clear glass in accordance with JIS R3202 (1996) are used to prepare laminated glass (hereinafter, sometimes described as laminated glass C). Specifically, the interlayer film 1 is sandwiched between the two sheets of clear glass to obtain the laminated glass C. In this case, the parallel light transmittance in a portion of the dark color part 11 of the laminated glass C is less than or equal to 30%, the parallel light transmittance in a portion of the gradation part 12 of the laminated glass C is continuously increased from the dark color part 11 side to the transparent part 13 side, and the parallel light transmittance in a portion of the transparent part 13 of the laminated glass C is greater than or equal to 60%. In the interlayer film 1, a broken line X1 is the boundary line which shows whether or not the parallel light transmittance is less than or equal to 30%. In the interlayer film 1, a broken line X2 is the boundary line which shows whether or not the parallel light transmittance is greater than or equal to 60%.

The interlayer film 1 has a first resin layer 16 and a second resin layer 17. Each of the dark color part 11, the gradation part 12 and the transparent part 13 has the first resin layer 16. The first resin layer 16 contains a thermoplastic resin and a plasticizer. Each of the dark color part 11 and the gradation part 12 further has the second resin layer 17. The second resin layer 17 is embedded in the first resin layer 16 so as to allow the first resin layer 16 to be situated on surfaces at both sides in the thickness direction of the interlayer film 1. The second resin layer 17 contains a thermoplastic resin, a plasticizer and inorganic particles. The second resin layer 17 is lower in transparency than the first resin layer 16.

In the interlayer film 1, the thickness of the second resin layer 17 in the gradation part 12 is continuously decreased from the dark color part 11 side to the transparent part 13 side so that the parallel light transmittance in a portion of the gradation part 12 of the laminated glass C is continuously increased from the dark color part 11 side to the transparent part 13 side. Moreover, in the interlayer film 1, the total thickness of the first resin layers 16 in the gradation part 12 is continuously increased from the dark color part 11 side to the transparent part 13 side so that the parallel light transmittance in a portion of the gradation part 12 of the laminated glass C is continuously increased from the dark color part 11 side to the transparent part 13 side.

In this connection, as shown in FIG. 9, in an interlayer film 51 having a dark color part 61 of the same shape as the dark color part 11, having a gradation part 62 of the same shape as the gradation part 12, having a transparent part 63 of the same shape as the transparent part 13, and as a result thereof, having the same shape as the interlayer film 1, a broken line X2 indicating the boundary line which shows whether or not the parallel light transmittance is greater than or equal to 60% may be positioned on the way along which the total thickness of first resin layers 66 is continuously increased from the dark color part 61 side to the transparent part 63 side. The boundary between the gradation part 62 and the transparent part 63 is determined by whether the parallel light transmittance is greater than or equal to 60% or not.

FIG. 2 shows an interlayer film for laminated glass in accordance with the second embodiment of the present invention represented as a cross-sectional view.

The interlayer film 1A shown in FIG. 2 is provided with a dark color part 11A, a gradation part 12A and a transparent part 13A. In the interlayer film 1A, the dark color part 11A, the gradation part 12A and the transparent part 13A are arranged side by side in the direction orthogonal to the thickness direction of the interlayer film 1A in this order.

The interlayer film 1A and two sheets of clear glass in accordance with JIS R3202 (1996) are used to prepare laminated glass (hereinafter, sometimes described as laminated glass CA). Specifically, the interlayer film 1A is sandwiched between the two sheets of clear glass to obtain the laminated glass CA. In this case, the parallel light transmittance in a portion of the dark color part 11A of the laminated glass CA is less than or equal to 30%, the parallel light transmittance in a portion of the gradation part 12A of the laminated glass CA is continuously increased from the dark color part 11A side to the transparent part 13A side, and the parallel light transmittance in a portion of the transparent part 13A of the laminated glass CA is greater than or equal to 60%. In the interlayer film 1A, a broken line X1 is the boundary line which shows whether or not the parallel light transmittance is less than or equal to 30%. In the interlayer film 1A, a broken line X2 is the boundary line which shows whether or not the parallel light transmittance is greater than or equal to 60%.

The interlayer film 1A has a first resin layer 16A and a second resin layer 17A. Each of the dark color part 11A, the gradation part 12A and the transparent part 13A has the first resin layer 16A. The first resin layer 16A contains a thermoplastic resin and a plasticizer. Each of the dark color part 11A and the gradation part 12A further has the second resin layer 17A. The second resin layer 17A is embedded in the first resin layer 16A so as to allow the first resin layer 16A to be situated on surfaces at both sides in the thickness direction of the interlayer film 1A. The second resin layer 17A contains a thermoplastic resin, a plasticizer and inorganic particles. The second resin layer 17A is lower in transparency than the first resin layer 16A.

In the interlayer film 1A, the thickness of the second resin layer 17A in the gradation part 12A is continuously decreased from the dark color part 11A side to the transparent part 13A side so that the parallel light transmittance in a portion of the gradation part 12A of the laminated glass CA is continuously increased from the dark color part 11A side to the transparent part 13A side. Moreover, in the interlayer film 1A, the total thickness of the first resin layers 16A in the gradation part 12A is continuously increased from the dark color part 11A side to the transparent part 13A side so that the parallel light transmittance in a portion of the gradation part 12A of the laminated glass CA is continuously increased from the dark color part 11A side to the transparent part 13A side. Moreover, in the interlayer film 1A, the thickness of the second resin layer 17A in the dark color part 11A is decreased from the outer end part side of the dark color part 11A to the transparent part 13A side. As described above, the interlayer film 1A in which the second resin layer 17A in the dark color part 11A varies in thickness from the outer end part side of the dark color part 11A to the transparent part 13 side is also one embodiment of the present invention.

In this connection, as shown in FIG. 2, in the case where the thickness of the second resin layer 17A in each of the dark color part 11A and the gradation part 12A is continuously decreased from the outer end part side of the dark color part 11A or the dark color part 11A side to the transparent part 13A side, an area where the parallel light transmittance in the laminated glass CA is less than or equal to 30% is defined as the dark color part 11A, and an area where the parallel light transmittance in the laminated glass CA is greater than 30% is defined as the gradation part 12A.

FIG. 3 shows an interlayer film for laminated glass in accordance with the third embodiment of the present invention represented as a cross-sectional view.

The interlayer film 1B shown in FIG. 3 is provided with a dark color part 11B, a gradation part 12B and a transparent part 13B. In the interlayer film 1B, the dark color part 11B, the gradation part 12B and the transparent part 13B are arranged side by side in the direction orthogonal to the thickness direction of the interlayer film 1B in this order.

The interlayer film 1B and two sheets of clear glass in accordance with JIS R3202 (1996) are used to prepare laminated glass (hereinafter, sometimes described as laminated glass CB). Specifically, the interlayer film 1B is sandwiched between the two sheets of clear glass to obtain the laminated glass CB. In this case, the parallel light transmittance in a portion of the dark color part 11B of the laminated glass CB is less than or equal to 30%, the parallel light transmittance in a portion of the gradation part 12B of the laminated glass CB is continuously increased from the dark color part 11B side to the transparent part 13B side, and the parallel light transmittance in a portion of the transparent part 13B of the laminated glass CB is greater than or equal to 60%. In the interlayer film 1B, a broken line X1 is the boundary line which shows whether or not the parallel light transmittance is less than or equal to 30%. In the interlayer film 1B, a broken line X2 is the boundary line which shows whether or not the parallel light transmittance is greater than or equal to 60%.

The interlayer film 1B has a first resin layer 16B and a second resin layer 17B. Each of the dark color part 11B, the gradation part 12B and the transparent part 13B has the first resin layer 16B. The first resin layer 16B contains a thermoplastic resin and a plasticizer. Each of the dark color part 11B, the gradation part 12B and the transparent part 13B further has the second resin layer 17B. The second resin layer 17B is embedded in the first resin layer 16B so as to allow the first resin layer 16B to be situated on surfaces at both sides in the thickness direction of the interlayer film 1B. The second resin layer 17B contains a thermoplastic resin, a plasticizer and inorganic particles. The second resin layer 17B is lower in transparency than the first resin layer 16B.

In the interlayer film 1B, the thickness of the second resin layer 17B in the gradation part 12B is continuously decreased from the dark color part 11B side to the transparent part 13B side so that the parallel light transmittance in a portion of the gradation part 12B of the laminated glass CB is continuously increased from the dark color part 11B side to the transparent part 13B side. Moreover, in the interlayer film 1B, the total thickness of the first resin layers 16B in the gradation part 12B is continuously increased from the dark color part 11B side to the transparent part 13B side so that the parallel light transmittance in a portion of the gradation part 12B of the laminated glass CB is continuously increased from the dark color part 11B side to the transparent part 13B side. Moreover, in the interlayer film 1B, the thickness of the second resin layer 17B in the dark color part 11B is decreased from the outer end part side of the dark color part 11B to the transparent part 13B side. Furthermore, in the interlayer film 1B, the thickness of the second resin layer 17 in the transparent part 13B is decreased from the dark color part 11B side to the outer end part side of the transparent part 13B. As described above, the interlayer film 1B in which the second resin layer 17B in the dark color part 11B and the transparent part 13B varies in thickness from the outer end part side of the dark color part 11B or the dark color part 11B side to the transparent part 13B side or the outer end part side of the transparent part 13B is also one embodiment of the present invention.

In this connection, as shown in FIG. 3, in the case where the thickness of the second resin layer 17B in each of the dark color part 11B, the gradation part 12B and the transparent part 13B is continuously decreased from the outer end part side of the dark color part 11B or the dark color part 11B side to the transparent part 13B side or the outer end part side of the transparent part 13B, an area where the parallel light transmittance in the laminated glass CB is less than or equal to 30% is defined as the dark color part 11B, an area where the parallel light transmittance in the laminated glass CB is greater than 30% and less than 60% is defined as the gradation part 12B, and an area where the parallel light transmittance in the laminated glass CB is greater than or equal to 60% is defined as the transparent part 13B.

FIG. 4 shows an interlayer film for laminated glass in accordance with the fourth embodiment of the present invention represented as a cross-sectional view.

The interlayer film 10 shown in FIG. 4 is provided with a dark color part 11Ca and a dark color part 11Cb, a gradation part 12Ca and a gradation part 12Cb, and a transparent part 13C. In the interlayer film 10, the dark color part 11Ca, the gradation part 12Ca and the transparent part 13C are arranged side by side in the direction orthogonal to the thickness direction of the interlayer film 10 in this order. Furthermore, in the interlayer film 1C, the dark color part 11Cb, the gradation part 12Cb and the transparent part 13C are arranged side by side in the direction orthogonal to the thickness direction of the interlayer film 10 in this order. As described above, the interlayer film 10 in which, from each of both ends of the interlayer film 10, the dark color part 1Ca, the gradation part 12Ca and the transparent part 13C are arranged side by side in the direction orthogonal to the thickness direction of the interlayer film 10 and the dark color part 11Cb, the gradation part 12Cb and the transparent part 13C are arranged side by side in the direction orthogonal to the thickness direction of the interlayer film 10 is also one embodiment of the present invention.

The interlayer film 10 and two sheets of clear glass in accordance with JIS R3202 (1996) are used to prepare laminated glass (hereinafter, sometimes described as laminated glass CC). Specifically, the interlayer film 10 is sandwiched between the two sheets of clear glass to obtain the laminated glass CC. In this case, the parallel light transmittance in each of a portion of the dark color part 11Ca and a portion of the dark color part 11Cb of the laminated glass CC is less than or equal to 30%, the parallel light transmittance in each of a portion of the gradation part 12Ca and a portion of the gradation part 12Cb of the laminated glass CC is continuously increased from the dark color part 11Ca or dark color part 11Cb side to the transparent part 13C side, and the parallel light transmittance in a portion of the transparent part 13C of the laminated glass CC is greater than or equal to 60%. In the interlayer film 1C, each of two broken lines X1 is the boundary line which shows whether or not the parallel light transmittance is less than or equal to 30%. In the interlayer film 10, each of two broken lines X2 is the boundary line which shows whether or not the parallel light transmittance is greater than or equal to 60%.

The interlayer film 10 has a first resin layer 16C and second resin layers 17C. Each of the dark color part 11Ca, the dark color part 11Cb, the gradation part 12Ca, the gradation part 12Cb and the transparent part 13C has the first resin layer 16C. The first resin layer 16C contains a thermoplastic resin and a plasticizer. Each of the dark color part 11Ca, the dark color part 11Cb, the gradation part 12Ca and the gradation part 12Cb further has the second resin layer 17C. The second resin layer 17C is embedded in the first resin layer 16C so as to allow the first resin layer 16C to be situated on surfaces at both sides in the thickness direction of the interlayer film 10. The second resin layer 17C contains a thermoplastic resin, a plasticizer and inorganic particles. The second resin layer 17C is lower in transparency than the first resin layer 16C. The second resin layer 17C at the dark color part 11Ca side and the second resin layer 17C at the dark color part 11Cb side may be the same as or different from each other.

In the interlayer film 1C, the thickness of the second resin layer 17C in each of the gradation part 12Ca and the gradation part 12Cb is continuously decreased from the dark color part 11Ca or dark color part 11Cb side to the transparent part 13C side so that the parallel light transmittance in each of a portion of the gradation part 12Ca and a portion of the gradation part 12Cb of the laminated glass CC is continuously increased from the dark color part 11Ca or dark color part 11Cb side to the transparent part 13C side. Moreover, in the interlayer film 1C, the total thickness of the first resin layers 16C in each of the gradation part 12Ca and the gradation part 12Cb is continuously increased from the dark color part 11Ca or dark color part 11Cb side to the transparent part 13C side so that the parallel light transmittance in each of a portion of the gradation part 12Ca and a portion of the gradation part 12Cb of the laminated glass CC is continuously increased from the dark color part 11Ca or dark color part 11Cb side to the transparent part 13C side.

FIG. 5 shows an interlayer film for laminated glass in accordance with the fifth embodiment of the present invention represented as a cross-sectional view.

The interlayer film 1D shown in FIG. 5 is provided with a dark color part 11D, a gradation part 12Da and a gradation part 12Db, a transparent part 13Da, and a transparent part 13Db. In the interlayer film 1D, the dark color part 11D, the gradation part 12Da and the transparent part 13Da are arranged side by side in the direction orthogonal to the thickness direction of the interlayer film 1D in this order. Furthermore, in the interlayer film 1D, the dark color part 11D, the gradation part 12Db and the transparent part 13Db are arranged side by side in the direction orthogonal to the thickness direction of the interlayer film 1D in this order. As described above, the interlayer film 1D in which, from the dark color part 11D of the interlayer film 1D to each of both ends, the dark color part 11D, the gradation part 12Da and the transparent part 13Da are arranged side by side in the direction orthogonal to the thickness direction of the interlayer film 1D and the dark color part 11D, the gradation part 12Db and the transparent part 13Db are arranged side by side in the direction orthogonal to the thickness direction of the interlayer film 1D is also one embodiment of the present invention.

The interlayer film 1D and two sheets of clear glass in accordance with JIS R3202 (1996) are used to prepare laminated glass (hereinafter, sometimes described as laminated glass CD). Specifically, the interlayer film 1D is sandwiched between the two sheets of clear glass to obtain the laminated glass CD. In this case, the parallel light transmittance in a portion of the dark color part 11D of the laminated glass CD is less than or equal to 30%, the parallel light transmittance in each of a portion of the gradation part 12Da and a portion of the gradation part 12Db of the laminated glass CD is continuously increased from the dark color part 11D side to each of both ends of the transparent part 13Da and transparent part 13Db sides, and the parallel light transmittance in each of a portion of the transparent part 13Da and a portion of the transparent part 13Db of the laminated glass CD is greater than or equal to 60%. In the interlayer film 1D, each of two broken lines X1 is the boundary line which shows whether or not the parallel light transmittance is less than or equal to 30%. In the interlayer film 1D, each of two broken lines X2 is the boundary line which shows whether or not the parallel light transmittance is greater than or equal to 60%.

The interlayer film 1D has a first resin layer 16D and a second resin layer 17D. Each of the dark color part 11D, the gradation part 12Da, the gradation part 12Db, the transparent part 13Da and the transparent part 13Db has the first resin layer 16D. The first resin layer 16D contains a thermoplastic resin and a plasticizer. Each of the dark color part 11D, the gradation part 12Da and the gradation part 12Db further has the second resin layer 17D. The second resin layer 17D is embedded in the first resin layer 16D so as to allow the first resin layer 16D to be situated on surfaces at both sides in the thickness direction of the interlayer film 1D. The second resin layer 17D contains a thermoplastic resin, a plasticizer and inorganic particles. The second resin layer 17D is lower in transparency than the first resin layer 16D.

In the interlayer film 1D, the thickness of the second resin layer 17D in each of the gradation part 12Da and the gradation part 12Db is continuously decreased from the dark color part 11D side to the transparent part 13Da or transparent part 13Db side so that the parallel light transmittance in each of a portion of the gradation part 12Da and a portion of the gradation part 12Db of the laminated glass CD is continuously increased from the dark color part 11D side to the transparent part 13Da or transparent part 13Db side. Moreover, in the interlayer film 1D, the total thickness of the first resin layers 16D in each of the gradation part 12Da and the gradation part 12Db is continuously increased from the dark color part 11D side to the transparent part 13Da or transparent part 13Db side so that the parallel light transmittance in each of a portion of the gradation part 12Da and a portion of the gradation part 12Db of the laminated glass CD is continuously increased from the dark color part 11D side to the transparent part 13Da or transparent part 13Db side.

FIG. 6 shows an interlayer film for laminated glass in accordance with the sixth embodiment of the present invention represented as a cross-sectional view.

The interlayer film 1E shown in FIG. 6 is prepared by allowing the interlayer film 1 shown in FIG. 1 and a third resin layer 18 to be layered in the thickness direction. As described above, the interlayer film 1E containing another resin layer other than the first resin layer and the second resin layer is also one embodiment of the present invention.

The interlayer film 1E and two sheets of clear glass in accordance with JIS R3202 (1996) are used to prepare laminated glass (hereinafter, sometimes described as laminated glass CE). Specifically, the interlayer film 1E is sandwiched between the two sheets of clear glass to obtain the laminated glass CE. In this case, the parallel light transmittance in a portion of a dark color part 11E of the laminated glass CE is less than or equal to 30%, the parallel light transmittance in a portion of a gradation part 12E of the laminated glass CE is continuously increased from the dark color part 11E side to the transparent part 13E side, and the parallel light transmittance in a portion of a transparent part 13E of the laminated glass CE is greater than or equal to 60%. In the interlayer film 1E, a broken line X1 is the boundary line which shows whether or not the parallel light transmittance is less than or equal to 30%. In the interlayer film 1E, a broken line X2 is the boundary line which shows whether or not the parallel light transmittance is greater than or equal to 60%.

The interlayer film 1E has a first resin layer 16, a second resin layer 17, and a third resin layer 18. Each of the dark color part 11E, the gradation part 12E and the transparent part 13E has the first resin layer 16 and the third resin layer 18. The first resin layer 16 contains a thermoplastic resin and a plasticizer. It is preferred that the third resin layer 18 contain a thermoplastic resin and a plasticizer. Each of the dark color part 11E and the gradation part 12E further has the second resin layer 17. The second resin layer 17 is embedded in the first resin layer 16 so as to allow the first resin layer 16 to be situated on surfaces at both sides in the thickness direction of a laminate composed of the first resin layer 16X and the second resin layer 17X (the thickness direction of the interlayer film 1 excluding the third resin layer 18). The second resin layer 17 contains a thermoplastic resin, a plasticizer and inorganic particles. The second resin layer 17 is lower in transparency than the first resin layer 16.

In the interlayer film 1E, the thickness of the second resin layer 17 in the gradation part 12E is continuously decreased from the dark color part 11E side to the transparent part 13E side so that the parallel light transmittance in a portion of the gradation part 12E of the laminated glass CE is continuously increased from the dark color part 11E side to the transparent part 13E side. Moreover, in the interlayer film 1E, the total thickness of the first resin layers 16 in the gradation part 12E is continuously increased from the dark color part 11E side to the transparent part 13E side so that the parallel light transmittance in a portion of the gradation part 12E of the laminated glass CE is continuously increased from the dark color part 11E side to the transparent part 13E side. In this connection, the thickness of the third resin layer 18 is almost constant over the whole area of the interlayer film 1E. The thickness of the third resin layer may vary in the direction orthogonal to the thickness direction of the interlayer film.

Moreover, the third resin layers may be arranged on both faces of the interlayer film 1. Moreover, the second interlayer film for laminated glass including the above-mentioned second configuration may be provided with the third resin layer. Moreover, in the interlayer film 1E, another resin layer other than the first resin layer 16, the second resin layer 17 and the third resin layer 18 may be further layered.

FIG. 7 shows an interlayer film for laminated glass in accordance with the seventh embodiment of the present invention represented as a cross-sectional view.

The interlayer film 1X shown in FIG. 7 is used for obtaining laminated glass. The interlayer film 1X is an interlayer film for laminated glass. The interlayer film 1X is provided with a dark color part 11X, a gradation part 12X and a transparent part 13X. In the interlayer film 1X, the dark color part 11X, the gradation part 12X and the transparent part 13X are arranged side by side in the direction orthogonal to the thickness direction of the interlayer film 1X in this order. The interlayer film 1X, and an interlayer film 1Y and an interlayer film 51X which are described below are the second interlayer films for laminated glass including the main configuration and the second configuration.

The interlayer film 1X and two sheets of clear glass in accordance with JIS R3202 (1996) are used to prepare laminated glass (hereinafter, sometimes described as laminated glass CX). Specifically, the interlayer film 1X is sandwiched between the two sheets of clear glass to obtain the laminated glass CX. In this case, the parallel light transmittance in a portion of the dark color part 11X of the laminated glass CX is less than or equal to 30%, the parallel light transmittance in a portion of the gradation part 12X of the laminated glass CX is continuously increased from the dark color part 11X side to the transparent part 13X side, and the parallel light transmittance in a portion of the transparent part 13X of the laminated glass CX is greater than or equal to 60%. In the interlayer film 1X, a broken line X1 is the boundary line which shows whether or not the parallel light transmittance is less than or equal to 30%. In the interlayer film 1X, a broken line X2 is the boundary line which shows whether or not the parallel light transmittance is greater than or equal to 60%.

The interlayer film 1X has a first resin layer 16X and a second resin layer 17X. Each of the dark color part 11X, the gradation part 12X and the transparent part 13X has the second resin layer 17X. The second resin layer 17X contains a thermoplastic resin, a plasticizer and inorganic particles. Each of the gradation part 12X and the transparent part 13X further has the first resin layer 16X. The first resin layer 16X is embedded in the second resin layer 17X so as to allow the second resin layer 17X to be situated on surfaces at both sides in the thickness direction of the interlayer film 1X. The first resin layer 16X contains a thermoplastic resin and a plasticizer. The second resin layer 17X is lower in transparency than the first resin layer 16X.

In the interlayer film 1X, the total thickness of the second resin layers 17X in the gradation part 12X is continuously decreased from the dark color part 11X side to the transparent part 13X side so that the parallel light transmittance in a portion of the gradation part 12X of the laminated glass CX is continuously increased from the dark color part 11X side to the transparent part 13X side. Moreover, in the interlayer film 1X, the thickness of the first resin layer 16X in the gradation part 12X is continuously increased from the dark color part 11X side to the transparent part 13X side so that the parallel light transmittance in a portion of the gradation part 12X of the laminated glass CX is continuously increased from the dark color part 11X side to the transparent part 13X side. The interlayer film 1X thus prepared is also one embodiment of the present invention.

In this connection, as shown in FIG. 10, in an interlayer film 51X having a dark color part 61X of the same shape as the dark color part 11X, having a gradation part 62X of the same shape as the gradation part 12X, having a transparent part 63X of the same shape as the transparent part 13X, and as a result thereof, having the same shape as the interlayer film 1X, a broken line X1 indicating the boundary line which shows whether or not the parallel light transmittance is less than or equal to 30% may be positioned on the way along which the total thickness of second resin layers 67X is continuously decreased from the dark color part 61X side to the transparent part 63X side. The boundary between the dark color part 61X and the gradation part 62X is determined by whether the parallel light transmittance is less than or equal to 30% or not.

FIG. 8 shows an interlayer film for laminated glass in accordance with the eighth embodiment of the present invention represented as a cross-sectional view.

The interlayer film 1Y shown in FIG. 8 is provided with a dark color part 11Y, a gradation part 12Y and a transparent part 13Y. In the interlayer film 1Y, the dark color part 11Y, the gradation part 12Y and the transparent part 13Y are arranged side by side in the direction orthogonal to the thickness direction of the interlayer film 1Y in this order.

The interlayer film 1Y and two sheets of clear glass in accordance with JIS R3202 (1996) are used to prepare laminated glass (hereinafter, sometimes described as laminated glass CY). Specifically, the interlayer film 1Y is sandwiched between the two sheets of clear glass to obtain the laminated glass CY. In this case, the parallel light transmittance in a portion of the dark color part 11Y of the laminated glass CY is less than or equal to 30%, the parallel light transmittance in a portion of the gradation part 12Y of the laminated glass CY is continuously increased from the dark color part 11Y side to the transparent part 13Y side, and the parallel light transmittance in a portion of the transparent part 13Y of the laminated glass CY is greater than or equal to 60%. In the interlayer film 1Y, a broken line X1 is the boundary line which shows whether or not the parallel light transmittance is less than or equal to 30%. In the interlayer film 1Y, a broken line X2 is the boundary line which shows whether or not the parallel light transmittance is greater than or equal to 60%.

The interlayer film 1Y has a first resin layer 16Y and a second resin layer 17Y. Each of the dark color part 11Y, the gradation part 12Y and the transparent part 13Y has the second resin layer 17Y. The second resin layer 17Y contains a thermoplastic resin, a plasticizer and inorganic particles. Each of the gradation part 12Y and the transparent part 13Y further has the first resin layer 16Y. The first resin layer 16Y is embedded in the second resin layer 17Y so as to allow the second resin layer 17Y to be situated on surfaces at both sides in the thickness direction of the interlayer film 1Y. The first resin layer 16Y contains a thermoplastic resin and a plasticizer. The second resin layer 17Y is lower in transparency than the first resin layer 16Y.

In the interlayer film 1Y, the total thickness of the second resin layers 17Y in the gradation part 12Y is continuously decreased from the dark color part 11Y side to the transparent part 13Y side so that the parallel light transmittance in a portion of the gradation part 12Y of the laminated glass CY is continuously increased from the dark color part 11Y side to the transparent part 13Y side. Moreover, in the interlayer film 1Y, the thickness of the first resin layer 16Y in the gradation part 12Y is continuously increased from the dark color part 11Y side to the transparent part 13Y side so that the parallel light transmittance in a portion of the gradation part 12Y of the laminated glass CY is continuously increased from the dark color part 11Y side to the transparent part 13Y side. Moreover, in the interlayer film 1Y, the total thickness of the second resin layers 17Y in the transparent part 13Y is decreased from the dark color part 11Y side to the outer end part side of the transparent part 13Y. As described above, the interlayer film 1Y in which the second resin layers 17Y in the dark color part 11Y vary in the total thickness from the dark color part 11Y side to the outer end part side of the transparent part 13Y is also one embodiment of the present invention.

In this connection, as shown in FIG. 8, in the case where the total thickness of the second resin layers 17Y in each of the transparent part 13Y and the gradation part 12Y is continuously decreased from the dark color part 11Y side to the outer end part side of the transparent part 13Y, an area where the parallel light transmittance in the laminated glass CY is greater than or equal to 60% is defined as the transparent part 13Y, and an area where the parallel light transmittance in the laminated glass CY is less than 60% is defined as the gradation part 12Y.

By using such an interlayer film 1, an interlayer film 51, an interlayer film 1A, an interlayer film 1B, an interlayer film 1C, an interlayer film 1D, an interlayer film 1E, an interlayer film 1X, an interlayer film 51X, and an interlayer film 1Y mentioned above, it is possible to obtain laminated glass having a gradation pattern with suppressed color irregularity as well as having an excellent privacy protection property. In laminated glass prepared with the interlayer film 1, the interlayer film 51, the interlayer film 1A, the interlayer film 1B, the interlayer film 1C, the interlayer film 1D, the interlayer film 1E, the interlayer film 1X, the interlayer film 51X, or the interlayer film 1Y, although the laminated glass transmits light, it is possible to allow the laminated glass to have an area through which a person or an object positioned therebehind cannot be visually recognized.

The maximum value of the parallel light transmittance in a portion of the transparent part of laminated glass such as the laminated glass C, the laminated glass CA, the laminated glass CB, the laminated glass CC, the laminated glass CD, the laminated glass CE, the laminated glass CX and the laminated glass CY is preferably greater than or equal to 70% and more preferably greater than or equal to 78%. When the maximum value of the parallel light transmittance in a portion of the transparent part is greater than or equal to the above lower limit, laminated glass further excellent in lighting properties is obtained. The minimum value of the parallel light transmittance in a portion of the dark color part of the laminated glass is preferably less than or equal to 20%, more preferably less than or equal to 10%, further preferably less than or equal to 5%, and most preferably less than or equal to 2%. When the minimum value of the parallel light transmittance in a portion of the dark color part is less than or equal to the above upper limit, laminated glass further excellent in the privacy protection property is obtained.

The parallel light transmittance is measured in accordance with JIS R3106 (1998). Specifically, the laminated glass in a state of being installed on the light path between a light source and an integrating sphere, in parallel to the normal line of the optical axis and at a point apart from the integrating sphere by 13 cm so that only the transmitted parallel light is received by the integrating sphere is measured using a spectrophotometer. The parallel light transmittance means a visible light transmittance calculated from the spectral transmittance measured in this state. Examples of the spectrophotometer include "U-4100" available from Hitachi High-Technologies Corporation, and the like.

The maximum value of the total light transmittance in a portion of the transparent part of laminated glass such as the laminated glass C, the laminated glass CA, the laminated glass CB, the laminated glass CC, the laminated glass CD, the laminated glass CE, the laminated glass CX and the laminated glass CY is preferably greater than or equal to 60%, more preferably greater than or equal to 70%, further preferably greater than or equal to 80%, and most preferably greater than or equal to 85%. When the maximum value of the total light transmittance in a portion of the transparent part is greater than or equal to the above lower limit, laminated glass further excellent in lighting properties is obtained. The minimum value of the total light transmittance in a portion of the dark color part of the laminated glass is preferably greater than or equal to 5%, more preferably greater than or equal to 50%, further preferably greater than or equal to 60%, and especially preferably greater than or equal to 75%. When the minimum value of the total light transmittance in a portion of the dark color part is greater than or equal to the above lower limit, laminated glass further excellent in lighting properties is obtained. Moreover, the total light transmittance refers to the total of the parallel light transmittance and the diffused light transmittance.

The total light transmittance is measured in accordance with JIS R3106 (1998). Specifically, the obtained laminated glass is installed in parallel to and brought into close contact with an opening part of an integrating sphere so that all light rays transmitted are received by the integrating sphere using a spectrophotometer to measure the spectral transmittance. The total light transmittance means a visible light transmittance calculated from the spectral transmittance measured in this state. Examples of the spectrophotometer include "U-4100" available from Hitachi High-Technologies Corporation, and the like.

In a portion of the dark color part of laminated glass such as the laminated glass C, the laminated glass CA, the laminated glass CB, the laminated glass CC, the laminated glass CD, the laminated glass CE, the laminated glass CX and the laminated glass CY, it is preferred that the minimum value of the total light transmittance be greater than or equal to 75% in the case where the minimum value of the parallel light transmittance is greater than 20% and less than or equal to 30%, it is preferred that the minimum value of the total light transmittance be greater than or equal to 65% in the case where the minimum value of the parallel light transmittance is greater than 5% and less than or equal to 20%, and it is preferred that the minimum value of the total light transmittance be greater than or equal to 50% in the case where the minimum value of the parallel light transmittance is less than or equal to 5%. In a portion of the dark color part of laminated glass such as the laminated glass C, the laminated glass CA, the laminated glass CB, the laminated glass CC, the laminated glass CD, the laminated glass CE, the laminated glass CX and the laminated glass CY, it is preferred that the minimum value of the parallel light transmittance be less than or equal to 30% and the minimum value of the total light transmittance be greater than or equal to 75%, it is preferred that the minimum value of the parallel light transmittance be less than or equal to 20% and the minimum value of the total light transmittance be greater than or equal to 65%, and it is preferred that the minimum value of the parallel light transmittance be less than or equal to 5% and the minimum value of the total light transmittance be greater than or equal to 40%. In a portion of the dark color part of laminated glass such as the laminated glass C, the laminated glass CA, the laminated glass CB, the laminated glass CC, the laminated glass CD, the laminated glass CE, the laminated glass CX and the laminated glass CY, it is preferred that the minimum value of the total light transmittance be greater than or equal to 45% in the case where the minimum value of the parallel light transmittance is greater than or equal to 0.5%. When the minimum value of the parallel light transmittance and the minimum value of the total light transmittance in a portion of the dark color part satisfy the above-described requirement, with regard to the laminated glass, it is possible to further enhance the privacy protection property while maintaining the lighting properties high.

The average value of the thicknesses (T) of the interlayer film (see FIGS. 1 to 10) is not particularly limited. From the viewpoint of the practical aspect, the average value of the thicknesses (T) of the interlayer film is preferably greater than or equal to 0.1 mm, more preferably greater than or equal to 0.25 mm, preferably less than or equal to 3 mm, and more preferably less than or equal to 1.5 mm. When the average value of the thicknesses (T) of the interlayer film is greater than or equal to the above lower limit, the penetration resistance of laminated glass is enhanced.

With regard to the first interlayer film for laminated glass including the above-mentioned first configuration, over the whole area of the portion of the dark color part, the portion of the gradation part and the portion of the transparent part, the maximum value and the minimum value of the total thickness (T1+T2) of the first resin layers (see FIGS. 1 to 6, 9) are not particularly limited. From the viewpoint of the practical aspect, over the whole area of the portion of the dark color part, the portion of the gradation part and the portion of the transparent part, the minimum value of the total thickness (T1+T2) of the first resin layers is preferably greater than or equal to 0.08 mm, more preferably greater than or equal to 0.12 mm, preferably less than or equal to 3 mm, and more preferably less than or equal to 1.5 mm. Over the whole area of the portion of the dark color part, the portion of the gradation part and the portion of the transparent part, the maximum value of the total thickness (T1+T2) of the first resin layers is preferably greater than or equal to 0.1 mm, more preferably greater than or equal to 0.25 mm, preferably less than or equal to 3 mm, and more preferably less than or equal to 1.5 mm. When each of the minimum value and the maximum value of the total thickness (T1+T2) of the first resin layers is greater than or equal to the above lower limit, the penetration resistance of laminated glass is further enhanced. When each of the minimum value and the maximum value of the total thickness (T1+T2) of the first resin layers is less than or equal to the above upper limit, laminated glass further excellent in lighting properties is obtained. In this connection, in the portion of the dark color part and the portion of the gradation part, each of the minimum value and the maximum value of the total thickness (T1+T2) of the first resin layers refers to the total thickness of two first resin layers at both sides. With regard to the interlayer film 1, the interlayer film 1A, the interlayer film 1C, the interlayer film 1D, the interlayer film 1E and the interlayer film 51 shown in FIGS. 1, 2, 4, 5, 6 and 9, in the portion of the transparent part, each of the minimum value and the maximum value of the total thickness (T1+T2) of the first resin layers refers to the thickness of the transparent part itself. In general, the minimum value of the total thickness (T1+T2) of the first resin layers is calculated at the dark color part or calculated at the dark color part side end part of the gradation part. In general, the maximum value of the total thickness (T1+T2) of the first resin layers is calculated at the transparent part or calculated at the transparent part side end part of the gradation part.

In this connection, with regard to the two first resin layers situated on surfaces at both sides of the interlayer film in the portion of the dark color part and the portion of the gradation part, the thickness (T1) of the one first resin layer and the thickness (T2) of the other first resin layer may be the same as or different from each other.

The maximum value of the thickness (T3) of the second resin layer (see FIGS. 1 to 6, 9) in the whole area of the dark color part and the gradation part is not particularly limited. The maximum value of the thickness (T3) of the second resin layer in the whole area of the dark color part and the gradation part is preferably greater than or equal to 0.001 mm, preferably less than or equal to 0.8 mm, and more preferably less than or equal to 0.3 mm. When the maximum value of the thickness of the second resin layer is greater than or equal to the above lower limit, the parallel light transmittance in a portion of the dark color part of the laminated glass is further lowered, and laminated glass further excellent in the privacy protection property is obtained. When the maximum value of the thickness of the second resin layer is less than or equal to the above upper limit, laminated glass further excellent in lighting properties is obtained. In general, the maximum value of the thickness (T3) of the second resin layer is calculated at the dark color part or calculated at the dark color part side end part of the gradation part.

It is preferred that the total thickness (T1+T2) of the first resin layers in the dark color part be almost constant. The ratio of the maximum value of the total thickness (T1+T2) of the first resin layers in the dark color part to the minimum value of the total thickness (T1+T2) of the first resin layers in the dark color part is greater than or equal to 1, preferably less than or equal to 5, and more preferably less than or equal to 2.

In the case where the interlayer film for laminated glass according to the present invention contains a third resin layer, the thickness (T7) of the third resin layer (see FIG. 6) is not particularly limited. The thickness (T7) of the third resin layer is preferably greater than or equal to 0.03 mm, more preferably greater than or equal to 0.05 mm, preferably less than or equal to 0.3 mm, and more preferably less than or equal to 0.15 mm. When the thickness of the third resin layer is greater than or equal to the above lower limit, the penetration resistance and the sound insulating properties of laminated glass is further enhanced. When the thickness of the third resin layer is less than or equal to the above upper limit, laminated glass further excellent in lighting properties is obtained. In this connection, in the case where the third resin layers are arranged at both faces of the interlayer film, the thickness (T7) of the third resin layer refers to the total thickness of the third resin layers.

With regard to the second interlayer film for laminated glass including the above-mentioned second configuration, over the whole area of the portion of the dark color part, the portion of the gradation part and the portion of the transparent part, the maximum value and the minimum value of the total thickness (T4+T5) of the second resin layers (see FIGS. 7, 8, 10) are not particularly limited. From the viewpoint of the practical aspect, over the whole area of the portion of the dark color part, the portion of the gradation part and the portion of the transparent part, the minimum value of the total thickness (T4+T5) of the second resin layers is preferably greater than or equal to 0.05 mm, more preferably greater than or equal to 0.1 mm, preferably less than or equal to 3 mm, and more preferably less than or equal to 1.5 mm. Over the whole area of the portion of the dark color part, the portion of the gradation part and the portion of the transparent part, the maximum value of the total thickness (T4+T5) of the second resin layers is preferably greater than or equal to 0.3 mm, more preferably greater than or equal to 0.45 mm, preferably less than or equal to 3 mm, and more preferably less than or equal to 1.5 mm. When each of the minimum value and the maximum value of the total thickness (T4+T5) of the second resin layers is greater than or equal to the above lower limit, the penetration resistance of laminated glass is further enhanced. When each of the minimum value and the maximum value of the total thickness (T4+T5) of the second resin layers is less than or equal to the above upper limit, laminated glass further excellent in lighting properties is obtained. In this connection, in the portion of the transparent part and the portion of the gradation part, each of the minimum value and the maximum value of the total thickness (T4+T5) of the second resin layers refers to the total thickness of two second resin layers at both sides. With regard to the interlayer films 1X, 1Y and 51X shown in FIGS. 7, 8 and 10, in the portion of the dark color part, each of the minimum value and the maximum value of the total thickness (T4+T5) of the second resin layers refers to the thickness of the portion itself of the dark color part. In general, the maximum value of the total thickness (T4+T5) of the second resin layers is calculated at the dark color part or calculated at the dark color part side end part of the gradation part. In general, the minimum value of the total thickness (T4+T5) of the second resin layers is calculated at the transparent part or calculated at the transparent part side end part of the gradation part.

In this connection, with regard to the two second resin layers situated on surfaces at both sides of the interlayer film in the portion of the transparent part and the portion of the gradation part, the thickness (T4) of the one second resin layer and the thickness (T5) of the other second resin layer may be the same as or different from each other.

The maximum value of the thickness (T6) of the first resin layer (see FIGS. 7, 8, 10) in the whole area of the transparent part and the gradation part is not particularly limited. The maximum value of the thickness (T6) of the first resin layer in the whole area of the transparent part and the gradation part is preferably greater than or equal to 0.2 mm, more preferably greater than or equal to 0.4 mm, preferably less than or equal to 0.75 mm, and more preferably less than or equal to 0.58 mm. When the maximum value of the thickness of the first resin layer is greater than or equal to the above lower limit, the parallel light transmittance in a portion of the transparent part of the laminated glass is further heightened, and laminated glass further excellent in lighting properties is obtained. When the maximum value of the thickness of the first resin layer is less than or equal to the above upper limit, laminated glass further excellent in the privacy protection property is obtained. In general, the maximum value of the thickness (T6) of the first resin layer is calculated at the transparent part or calculated at the transparent part side end part of the gradation part.

It is preferred that the total thickness (T4+T5) of the second resin layers in the transparent part be almost constant. The ratio of the maximum value of the total thickness (T4+T5) of the second resin layers in the transparent part to the minimum value of the total thickness (T4+T5) of the second resin layers in the transparent part is greater than or equal to 1, preferably less than or equal to 5, and more preferably less than or equal to 2.

It is preferred that the thickness (T6) of the first resin layer in the transparent part be almost constant. The ratio of the maximum value of the thickness (T6) of the first resin layer in the transparent part to the minimum value of the thickness (T6) of the first resin layer in the transparent part is greater than or equal to 1, preferably less than or equal to 5, and more preferably less than or equal to 2.

In this connection, the thickness of each of the interlayer film and the respective layers is measured in the following manner.

The interlayer film is cut with a sharp razor blade so that the cross-section (the cross-section shown in each of FIGS. 1 to 10) of the dark color part, the gradation part and the transparent part in the layered direction including the dark color part, the gradation part and the transparent part is exposed. Afterward, the exposed cross-section of the interlayer film is observed with a digital microscope ("DSX500" available from Olympus Corporation) to measure the thicknesses of the interlayer film and respective layers with a micro gauge.

The length (L1) of the dark color part (see FIGS. 1 to 10) is preferably greater than or equal to 25 mm, more preferably greater than or equal to 100 mm, further preferably greater than or equal to 200 mm, especially preferably greater than or equal to 300 mm, preferably less than or equal to 2000 mm, more preferably less than or equal to 1500 mm, further preferably less than or equal to 1000 mm, especially preferably less than or equal to 700 mm, and most preferably less than or equal to 500 mm. In this connection, in the case where there are plural dark color parts, the length (L1) of the dark color part refers to the length per one dark color part.

The length (L2) of the gradation part (see FIGS. 1 to 10) is preferably greater than or equal to 10 mm, preferably less than or equal to 1500 mm, more preferably less than or equal to 1000 mm, further preferably less than or equal to 500 mm, and most preferably less than or equal to 300 mm. In this connection, in the case where there are plural gradation parts, the length (L2) of the gradation part refers to the length per one gradation part.

The length (L3) of the transparent part (see FIGS. 1 to 10) is not particularly limited and appropriately adjusted depending on the application of the interlayer film and the laminated glass, and the like. In this connection, in the case where there are plural transparent parts, the length (L3) of the transparent part refers to the length per one transparent part.

The lengths (L1, L2, L3) of the dark color part, the gradation part and the transparent part mean the lengths of the dark color part, the gradation part and the transparent part in the direction along which the dark color part, the gradation part and the transparent part are arranged side by side.

It is preferred that the complex viscosity at 200° C. of the second resin layer be greater than or equal to 0.7 times the complex viscosity at 200° C. of the first resin layer, it is more preferred that the complex viscosity be greater than or equal to 0.8 time, it is further preferred that the complex viscosity be greater than or equal to 0.9 time, it is preferred that the complex viscosity be less than or equal to 2 times, it is more preferred that the complex viscosity be less than or equal to 1.5 times, and it is further preferred that the complex viscosity be less than or equal to 1.3 times. When the complex viscosities of the first resin layer and the second resin layer satisfy the above-mentioned requirement, it is possible to obtain laminated glass further excellent in the appearance design property in which the color irregularity is further suppressed.

Although the measurement method of the complex viscosity is not particularly limited, for example, the complex viscosity can be measured by the following method. With regard to the interlayer film for laminated glass according to the present invention, the first resin layer and the second resin layer are peeled off from each other and the first resin layer is removed. In a molding flask (2 cm in longitudinal length by 2 cm in transversal length by 0.76 mm in thickness) arranged between two sheets of polyethylene terephthalate (PET) films, 1 g of the first resin layer peeled off is placed and preheated for 10 minutes at a temperature of 150° C. and under a pressure of 0 kg/cm$^2$, and then press-molded for 15 minutes under a pressure of 80 kg/cm$^2$. Afterward, in a hand press machine previously set to 20° C., the press-molded first resin layer is installed and pressed for 10 minutes at 10 MPa to be cooled. Then, from the molding flask arranged between the two sheets of PET films, one sheet of the PET film is peeled off, and the press-molded product is stored for 24 hours in a constant-temperature and constant-humidity chamber (a humidity of 30% (±30), a temperature of 23° C.), and then measured for the viscoelasticity, using the ARES-G2 available from TA Instruments Japan Inc., in accordance with JIS K7244-10 (ISO6721-10) to measure the complex viscosity. As a jig used at the time of the viscoelasticity measurement, a parallel plate with a diameter of 8 mm is used. Moreover, the viscoelasticity measurement is performed under conditions of a frequency of 1 Hz and a strain of 8% at the measurement temperature of 200° C. The obtained complex viscosity is read as a value of the complex viscosity of the first resin layer at 200° C. Moreover, the complex viscosity of the second resin layer is measured in the same manner.

By allowing the content of the plasticizer which the first resin layer contains to be increased, it is possible to decrease the complex viscosity of the first resin layer. Moreover, by allowing the content of the plasticizer which the second resin layer contains to be increased, it is possible to decrease the complex viscosity of the second resin layer.

The complex viscosity can be measured by using a sample obtained at the end of 1 hour after the ingredients constituting the interlayer film for laminated glass according to the present invention are formed into an interlayer film for laminated glass, a first resin layer or a second resin layer. The interlayer film for laminated glass according to the present invention, or the first resin layer or the second resin layer contained in the interlayer film for laminated glass according to the present invention is obtained and then the complex viscosity can be measured. It is preferred that the measurement of the complex viscosity be initiated at the end of 1 hour after an interlayer film for laminated glass, a first resin layer or a second resin layer is obtained by using the ingredients constituting the interlayer film for laminated glass according to the present invention.

Hereinafter, the details of each ingredient used for the first resin layer and the second resin layer will be described.

(Thermoplastic Resin)

Each of the first resin layer and the second resin layer contains a thermoplastic resin. It is preferred that the third resin layer contain a thermoplastic resin. The thermoplastic resin in the first resin layer, the thermoplastic resin in the second resin layer and the thermoplastic resin in the third resin layer are not particularly limited. As the thermoplastic resin, a conventionally known thermoplastic resin can be used. One kind of the thermoplastic resin may be used alone, and two or more kinds thereof may be combinedly used. The thermoplastic resin in the first resin layer, the thermoplastic resin in the second resin layer and the thermoplastic resin in the third resin layer may be the same as or different from one another.

Examples of the thermoplastic resin include a polyvinyl acetal resin, an ethylene-vinyl acetate copolymer resin, an ethylene-acrylic copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the interlayer film to a laminated glass member is further heightened.

For example, the polyvinyl acetal resin can be produced by acetalizing polyvinyl alcohol with an aldehyde. For example, the polyvinyl alcohol is obtained by saponifying polyvinyl acetate. The saponification degree of the polyvinyl alcohol generally lies within the range of 80 to 99.8% by mole.

The average polymerization degree of the polyvinyl alcohol is preferably greater than or equal to 200, more preferably greater than or equal to 500, preferably less than or equal to 5000, more preferably less than or equal to 3500, and further preferably less than or equal to 3000. When the average polymerization degree is greater than or equal to the above lower limit, the penetration resistance of laminated glass is further enhanced. When the average polymerization degree is less than or equal to the above upper limit, the resin is easily formed into an interlayer film. Moreover, by heightening the average polymerization degree of the polyvinyl alcohol, the complex viscosity of the resulting polyvinyl acetal resin can be increased and the complex viscosity of the first resin layer or the second resin layer can be increased.

The aldehyde is not particularly limited. In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. It is preferred that the number of carbon atoms of the aldehyde be 3 or 4, and it is more preferred that the number of carbon atoms of the aldehyde be 4. One kind of the aldehyde may be used alone, and two or more kinds thereof may be combinedly used.

The content ratio of the hydroxyl group (the amount of hydroxyl groups) of the polyvinyl acetal resin is preferably greater than or equal to 10% by mole, more preferably greater than or equal to 15% by mole, further preferably greater than or equal to 18% by mole, preferably less than or equal to 40% by mole, and more preferably less than or equal to 35% by mole. When the content ratio of the hydroxyl group is greater than or equal to the above lower limit, the adhesive force of the interlayer film is further heightened. Moreover, when the content ratio of the hydroxyl group is less than or equal to the above upper limit, the flexibility of the interlayer film is enhanced and the handling of the interlayer film is facilitated. Moreover, by heightening the content ratio of the hydroxyl group of the polyvinyl acetal resin, the complex viscosity of the polyvinyl acetal resin can be increased and the complex viscosity of the first resin layer or the second resin layer can be increased.

The content ratio of the hydroxyl group of the polyvinyl acetal resin is a value expressing the mole fraction determined by dividing the amount of ethylene groups to which the hydroxyl group is bonded by the total amount of ethylene groups in the main chain in terms of percentage. For example, the amount of ethylene groups to which the hydroxyl group is bonded can be measured in accordance with JIS K6726 "Testing methods for polyvinyl alcohol" or in accordance with ASTM D1396-92 to be determined.

The acetylation degree (the amount of acetyl groups) of the polyvinyl acetal resin is preferably greater than or equal to 0.1% by mole, more preferably greater than or equal to 0.3% by mole, further preferably greater than or equal to 0.5% by mole, preferably less than or equal to 30% by mole, more preferably less than or equal to 25% by mole, and further preferably less than or equal to 20% by mole. When the acetylation degree is greater than or equal to the above lower limit, the compatibility between the polyvinyl acetal resin and a plasticizer is heightened. When the acetylation degree is less than or equal to the above upper limit, the moisture resistance of the interlayer film and laminated glass is enhanced.

The acetylation degree is a value expressing the mole fraction determined by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain in terms of percentage. For example, the amount of ethylene groups to which the acetal group is bonded can be measured in accordance with JIS K6728 "Testing methods for polyvinyl butyral" or in accordance with ASTM D1396-92.

The acetalization degree of the polyvinyl acetal resin (the butyralization degree in the case of a polyvinyl butyral resin) is preferably greater than or equal to 60% by mole, more preferably greater than or equal to 63% by mole, preferably less than or equal to 85% by mole, more preferably less than or equal to 75% by mole, and further preferably less than or equal to 70% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage.

The acetalization degree can be calculated by a method in accordance with JIS K6728 "Testing methods for polyvinyl butyral" or a method in accordance with ASTM D1396-92.

In this connection, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral". In the case where the polyvinyl acetal resin is a polyvinyl butyral resin, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral".

(Plasticizer)

Each of the first resin layer and the second resin layer contains a plasticizer. It is preferred that the third resin layer contain a plasticizer. The plasticizer in the first resin layer, the plasticizer in the second resin layer and the plasticizer in the third resin layer are not particularly limited. As the plasticizer, a conventionally known plasticizer can be used. One kind of the plasticizer may be used alone, and two or more kinds thereof may be combinedly used. The plasticizer in the first resin layer, the plasticizer in the second resin layer and the plasticizer in the third resin layer may be the same as or different from one another.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

The monobasic organic acid ester is not particularly limited and examples thereof include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

The polybasic organic acid ester is not particularly limited and examples thereof include an ester compound of a polybasic organic acid and an alcohol having a linear or branched structure of 4 to 8 carbon atoms. Examples of the polybasic organic acid include adipic acid, sebacic acid, azelaic acid, and the like.

The organic ester plasticizer is not particularly limited and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapryate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic acid alkyd, a mixture of a phosphoric acid ester and an adipic acid ester, and the like. Organic ester plasticizers other than these may be used.

The organic phosphate plasticizer is not particularly limited and examples thereof include tributoxyethyl phosphate, isodecyl phenyl phosphate, triisopropyl phosphate, and the like.

It is preferred that the plasticizer be a diester plasticizer represented by the following formula (1).

[Chemical 1]

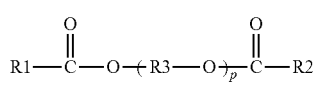

Formula (1)

In the foregoing formula (1), R1 and R2 each represent an organic group with 5 to 10 carbon atoms, R3 represents an ethylene group, an isopropylene group or an n-propylene group, and p represents an integer of 3 to 10. It is preferred that R1 and R2 in the foregoing formula (1) each be an organic group with 6 to 10 carbon atoms.

It is preferred that the plasticizer include at least one kind among triethylene glycol di-2-ethylhexanoate (3GO) and triethylene glycol di-2-ethylbutyrate (3GH), and it is more preferred that the plasticizer include triethylene glycol di-2-ethylhexanoate.

The content of the plasticizer is not particularly limited. Relative to 100 parts by mass of the whole thermoplastic resin in the interlayer film, the whole content of the plasticizers in the interlayer film is preferably greater than or equal to 25 parts by mass, more preferably greater than or equal to 30 parts by mass, preferably less than or equal to 60 parts by mass, and more preferably less than or equal to 50 parts by mass. Relative to 100 parts by mass of the thermoplastic resin in the first resin layer, the content of the plasticizer in the first resin layer is preferably greater than or equal to 25 parts by mass, more preferably greater than or equal to 30 parts by mass, further preferably greater than or equal to 35 parts by mass, preferably less than or equal to 60 parts by mass, more preferably less than or equal to 50 parts by mass, and further preferably less than or equal to 41 parts by mass. Relative to 100 parts by mass of the thermoplastic resin in the second resin layer, the content of the plasticizer in the second resin layer is preferably greater than or equal to 25 parts by mass, more preferably greater than or equal to 30 parts by mass, further preferably greater than or equal to 31 parts by mass, preferably less than or equal to 60 parts by mass, more preferably less than or equal to 50 parts by mass, and further preferably less than or equal to 44 parts by mass. When the content of the plasticizer is greater than or equal to the above lower limit, the penetration resistance of laminated glass is further enhanced. When the content of the plasticizer is less than or equal to the above upper limit, the transparency of the interlayer film is further enhanced.

Relative to 100 parts by mass of the thermoplastic resin in the third resin layer, the content of the plasticizer in the third resin layer is preferably greater than or equal to 40 parts by mass, more preferably greater than or equal to 45 parts by mass, preferably less than or equal to 90 parts by mass, and more preferably less than or equal to 80 parts by mass. When the content of the plasticizer is greater than or equal to the above lower limit, the penetration resistance and the sound insulating properties of laminated glass are further enhanced. When the content of the plasticizer is less than or equal to the above upper limit, the transparency of the interlayer film is further enhanced.

Moreover, by increasing the content of the plasticizer in the first resin layer or the content of the plasticizer in the second resin layer, it is possible to decrease the complex viscosity of each the first resin layer or the second resin layer.

In order to allow the complex viscosity at 200° C. of the second resin layer to be greater than or equal to 0.7 times and less than or equal to 2 times the complex viscosity at 200° C. of the first resin layer, it is preferred that the content of the plasticizer in the first resin layer and the content of the plasticizer in the second resin layer satisfy the following requirement.

In order to allow the complex viscosity at 200° C. of the second resin layer to be greater than or equal to 0.7 times and less than or equal to 2 times the complex viscosity at 200° C. of the first resin layer, it is preferred that, relative to 100 parts by mass of the thermoplastic resin in the first resin layer, the content of the plasticizer in the first resin layer be greater than or equal to 35 parts by mass and less than or equal to 45 parts by mass, and relative to 100 parts by mass of the thermoplastic resin in the second resin layer, the content of the plasticizer in the second resin layer be greater than or equal to 30 parts by mass and less than or equal to 50 parts by mass. In particular, in the case where the thermoplastic resins used for the first resin layer and the second resin layer are the same as each other, it is preferred that, relative to 100 parts by mass of the thermoplastic resin in the first resin layer, the content of the plasticizer in the first resin layer be greater than or equal to 35 parts by mass and less than or equal to 41 parts by mass, and relative to 100 parts by mass of the thermoplastic resin in the second resin layer, the content of the plasticizer in the second resin layer be greater than or equal to 31 parts by mass and less than or equal to 44 parts by mass.

(Inorganic Particles)

The second resin layer contains inorganic particles. The inorganic particle is not particularly limited. As the inorganic particle, a conventionally known inorganic particle can be used. One kind of the inorganic particle may be used alone, and two or more kinds thereof may be combinedly used.

Examples of the inorganic particles include calcium carbonate particles, alumina particles, kaolin clay particles, calcium silicate particles, magnesium oxide particles, magnesium hydroxide particles, aluminum hydroxide particles, magnesium carbonate particles, talc particles, feldspar powder particles, mica particles, barite particles, barium carbonate particles, titanium oxide particles, silica particles, glass beads, and the like.

It is preferred that the inorganic particles include at least one kind selected from the group consisting of calcium carbonate particles, titanium oxide particles and silica particles, and it is more preferred that the inorganic particles include calcium carbonate particles. By the use of these preferred inorganic particles, laminated glass further excellent in the appearance design property in which the appearance irregularity is suppressed at the time of allowing light to be transmitted therethrough is obtained.

The average particle diameter of the inorganic particles is preferably greater than or equal to 1 µm, preferably less than or equal to 100 µm, and more preferably less than or equal to 50 µm. The average particle diameter refers to the weight average particle diameter. The average particle diameter can be measured by a dynamic light scattering method using a light scattering measurement apparatus and an Ar laser as the light source. Examples of the light scattering measurement apparatus include "DLS-6000AL" available from Otsuka Electronics Co., Ltd., and the like.

It is preferred that the content of the inorganic particles be appropriately adjusted so that the parallel light transmittance in a portion of the dark color part of laminated glass such as the laminated glass C, the laminated glass CA, the laminated glass CB, the laminated glass CC, the laminated glass CD, the laminated glass CE, the laminated glass CX and the laminated glass CY is less than or equal to 30%, and the parallel light transmittance in a portion of the gradation part of laminated glass such as the laminated glass C, the laminated glass CA, the laminated glass CB, the laminated glass CC, the laminated glass CD, the laminated glass CE, the laminated glass CX and the laminated glass CY is continuously increased from the dark color part side to the transparent part side. In 100% by mass of the whole second resin layer, the content of the inorganic particles is preferably greater than or equal to 0.3% by mass, more preferably greater than or equal to 0.5% by mass, further preferably greater than or equal to 2% by mass, especially preferably greater than or equal to 3% by mass, preferably less than or equal to 25% by mass, and more preferably less than or equal to 5% by mass. When the content of the inorganic particles is greater than or equal to the above lower limit and less than or equal to the above upper limit, an interlayer film moderately colored is obtained, and it is possible to easily control the value of the parallel light transmittance of the laminated glass within a suitable range. Moreover, laminated glass further excellent in the appearance design property in which the appearance irregularity is more hardly generated at the time of allowing light to be transmitted therethrough is obtained. Moreover, by increasing the content of the inorganic particles in the second resin layer, it is possible to increase the complex viscosity of the second resin layer.

The area density of inorganic particles in the thickest portion of the second resin layer of the first interlayer film for laminated glass including the above-mentioned first configuration is preferably greater than or equal to 3 g/m$^2$, more preferably greater than or equal to 15 g/m$^2$, preferably less than or equal to 70 g/m$^2$, and more preferably less than or equal to 25 g/m$^2$. Examples of the measuring method for the area density of inorganic particles in the thickest portion of the second resin layer of the first interlayer film for laminated glass including the above-mentioned first configuration include a method described below.

The interlayer film is cut in the thickness direction so that the thickest portion of the second resin layer is situated at the center of the resulting sample to obtain a sample with a rectangular planar shape. The resulting sample is allowed to have a length of the short side of 1 cm, a thickness corresponding to the thickness of the interlayer film, and a length of the long side that the mass of the sample becomes 1 g. The long-side direction in the resulting sample is a direction orthogonal to the direction connecting the thickest portion of the second resin layer and a portion of the transparent part situated nearest to the thickest portion of the second resin layer. Provided that the thickest portion of the second resin layer is situated at the end part or near the end part of the second resin layer and a sample in which the thickest portion of the second resin layer is situated at the center in the long-side direction of the resulting sample fails to be obtained, one end in the long-side direction of the sample is aligned with the end part of the second resin layer to obtain a sample. Given that the thickest portion of the second resin layer is situated at the end part or near the end part of the second resin layer and a sample in which the thickest portion of the second resin layer is situated at the center in the short-side direction of the resulting sample fails to be obtained, one end in the short-side direction of the sample is aligned with the end part of the second resin layer to obtain a sample.

The area density of inorganic particles in the portion where the total thickness of the second resin layers is the thickest in the second interlayer film for laminated glass including the above-mentioned second configuration is preferably greater than or equal to 2 g/m$^2$, more preferably greater than or equal to 4 g/m$^2$, preferably less than or equal to 23 g/m$^2$, and more preferably less than or equal to 9 g/m$^2$. Examples of the measuring method for the area density of inorganic particles in the portion where the total thickness of the second resin layers is the thickest in the second interlayer film for laminated glass including the above-mentioned second configuration include a method described below.

The interlayer film is cut in the thickness direction so that the portion where the total thickness of the second resin layers is the thickest is situated at the center of the resulting sample to obtain a sample with a rectangular planar shape. The resulting sample is allowed to have a length of the short side of 1 cm, a thickness corresponding to the thickness of the interlayer film, and a length of the long side that the mass of the sample becomes 1 g. The long-side direction in the resulting sample is a direction orthogonal to the direction connecting the portion where the total thickness of the second resin layers is the thickest and a portion of the transparent part situated nearest to the portion where the total thickness of the second resin layers is the thickest. Provided that the portion where the total thickness of the second resin layers is the thickest is situated at the end part or near the end part of the second resin layer and a sample in which the portion where the total thickness of the second resin layers is the thickest is situated at the center in the long-side direction of the resulting sample fails to be obtained, one end in the long-side direction of the sample is aligned with the end part of the second resin layer to obtain a sample. Given that the portion where the total thickness of the second resin layers is the thickest is situated at the end part or near the end part of the second resin layer and a sample in which the portion where the total thickness of the second resin layers is the thickest is situated at the center in the short-side direction of the resulting sample fails to be obtained, one end in the short-side direction of the sample is aligned with the end part of the second resin layer to obtain a sample.

The area density of inorganic particles in the portion where the total thickness of the second resin layers is the thinnest in the second interlayer film for laminated glass including the above-mentioned second configuration is preferably greater than or equal to 0.5 g/m$^2$, more preferably greater than or equal to 1.5 g/m$^2$, preferably less than or equal to 2.5 g/m$^2$, and more preferably less than or equal to 2.0 g/m$^2$. Examples of the measuring method for the area density of inorganic particles in the portion where the total thickness of the second resin layers is the thinnest in the second interlayer film for laminated glass including the above-mentioned second configuration include a method described below.

The interlayer film is cut in the thickness direction so that the portion where the total thickness of the second resin layers is the thinnest is situated at the center of the resulting sample to obtain a sample with a rectangular planar shape. The resulting sample is allowed to have a length of the short side of 1 cm, a thickness corresponding to the thickness of the interlayer film, and a length of the long side that the mass of the sample becomes 1 g. The long-side direction in the resulting sample is a direction orthogonal to the direction connecting the portion where the total thickness of the second resin layers is the thinnest and a portion of the dark color part situated nearest to the portion where the total thickness of the second resin layers is the thinnest. Provided that the portion where the total thickness of the second resin layers is the thinnest is situated at the end part or near the end part of the second resin layer and a sample in which the portion where the total thickness of the second resin layers is the thinnest is situated at the center in the long-side direction of the resulting sample fails to be obtained, one end in the long-side direction of the sample is aligned with the end part of the second resin layer to obtain a sample. Given that the portion where the total thickness of the second resin layers is the thinnest is situated at the end part or near the end part of the second resin layer and a sample in which the portion where the total thickness of the second resin layers is the thickest is situated at the center in the short-side direction of the resulting sample fails to be obtained, one end in the short-side direction of the sample is aligned with the end part of the second resin layer to obtain a sample.

To 1 g of the obtained sample, 18 mL of an aqueous 70% by mass nitric acid solution is added, and the sample is held in place for 30 minutes at 200° C. using a microwave sample pretreatment apparatus ("ETHOS One" available from Milestone General K. K.) to be thermally decomposed, after which the sample is made up to a prescribed volume with ultrapure water having a specific resistance of 18.2 MΩ·cm under a condition of 25° C. to obtain a test liquid. Next, by means of a high frequency inductively coupled plasma emission spectrometer ("ICPE-9000" available from SHIMADZU CORPORATION), a metal element or the silicon constituting inorganic particles in the test liquid is quantitatively analyzed, and from the obtained value of the metal element or silicon content, the area density of inorganic particles is calculated.

It is preferred that the first resin layer do not contain inorganic particles. Provided that the laminated glass C satisfies the requirement on the parallel light transmittance, the first resin layer may contain inorganic particles. It is preferred that the content of inorganic particles in 100% by mass of the first resin layer be smaller than the content of inorganic particles in 100% by mass of the second resin layer. The content of inorganic particles in 100% by mass of the first resin layer is preferably less than 3% by mass, more preferably less than 2% by mass, further preferably less than 0.5% by mass, and especially preferably less than 0.3% by mass. Since the smaller the content of inorganic particles in 100% by mass of the first resin layer is, the smaller the existing amount of inorganic particles at the surface side of the interlayer film becomes, the interlayer film and the laminated glass member are more strongly bonded together.

(Other Ingredients)

Each of the interlayer film, the first resin layer and the second resin layer may include additives such as heat shielding particles, alight shielding agent, a coloring agent, an ultraviolet ray absorber, an oxidation inhibitor, an adhesive force regulating agent, a light stabilizer, a flame retardant, an antistatic agent, a moisture-resistance improving agent, a heat ray reflecting agent, and a heat ray absorber, as necessary. One kind of the additive may be used alone, and two or more kinds thereof may be combinedly used.

The heat shielding particle means a particle capable of absorbing infrared rays. Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, tungsten oxide particles, tin-doped indium oxide particles (ITO particles), tin-doped zinc oxide particles and silicon-doped zinc oxide particles, lanthanum hexaboride ($LaB_6$) particles, and the like. Moreover, as the heat shielding particles, zinc antimonate, cerium hexaboride, gold powder, silver powder, platinum powder, aluminum powder, and the like may be used.

Examples of the light shielding agent include carbon black, a red iron oxide, and the like.

Examples of the coloring agent include a pigment, a dye, and the like. It is preferred that the coloring agent be a pigment. Examples of the pigment include a dark reddish-brown mixed pigment prepared by mixing carbon black as a black pigment, a red pigment (C. I. Pigment red), a blue pigment (C. I. Pigment blue) and a yellow pigment (C. I. Pigment yellow), and the like.

Examples of the ultraviolet ray absorber include a malonic acid ester compound, an oxanilide compound, a benzotriazole compound, a benzophenone compound, a triazine compound, a benzoate compound, a hindered amine compound, and the like. Of these, a benzotriazole compound is preferred.

Examples of the oxidation inhibitor include t-butylhydroxytoluene, tetrakis-[methylene-3-(3',5'-di-t-butyl-4'-hydroxyphenyl)propionate]methane, and the like.

Examples of the adhesive force regulating agent include an alkali metal salt of each of an organic acid and an inorganic acid, an alkaline earth metal salt of each of an organic acid and an inorganic acid, a silane coupling agent, a modified silicone oil, and the like.

(Other Details of Interlayer Film for Laminated Glass)

The production method of the interlayer film for laminated glass according to the present invention is not particularly limited. As the production method of the interlayer film, a conventionally known method can be employed. Examples of the production method of the interlayer film include a production method of kneading respective ingredients described above and molding an interlayer film, and the like. A production method of extrusion-molding is preferred because the method is suitable for continuous production. Of these, in the case of producing the above-mentioned first interlayer film for laminated glass including the above-mentioned first configuration, a method of supplying respective ingredients to be contained in the above-mentioned second resin layer (a second resin composition for forming the second resin layer) to a main extruder, supplying respective ingredients for forming the above-mentioned first resin layer (a first resin composition for forming the first resin layer) to a sub-extruder, and attaching a multi-layer feed block to the tip end of each of the main extruder and the sub-extruder to perform the coextrusion is preferred. Moreover, in the case of producing the above-mentioned second interlayer film for laminated glass including the above-mentioned second configuration, a method of supplying respective ingredients to be contained in the above-mentioned first resin layer (a first resin composition for forming the first resin layer) to a main extruder, supplying respective ingredients for forming the above-mentioned second resin layer (a second resin composition for forming the second resin layer) to a sub-extruder, and attaching a multi-layer feed block to the tip end of each of the main extruder and the sub-extruder to perform the coextrusion is preferred. By the production method using the multi-layer feed block, the generation of a color streak which has been sometimes caused at the time of preparing an interlayer film is further suppressed.

Moreover, at the time of obtaining the interlayer film, it is preferred that a dispersion be prepared by dispersing inorganic particles together with a dispersing agent and the like blended as necessary in a plasticizer, the dispersion and other ingredients (preferably a thermoplastic resin) be kneaded, and the kneaded product be formed into an interlayer film. By using such a dispersion, the dispersibility of inorganic particles in the interlayer film is improved, and the addition effect of inorganic particles is further uniformly developed in the interlayer film.

The method for kneading is not particularly limited. Examples of this method include a method using an extruder, a plastograph, a kneader, a banbury mixer, a calender roll, or the like. Of these, a method using an extruder is preferred and a method using a twin screw extruder is more preferred because the methods are suitable for continuous production.

(Laminated Glass)

FIG. 11 shows an example of laminated glass prepared with the interlayer film for laminated glass shown in FIG. 1 represented as a cross-sectional view.

The laminated glass 21 shown in FIG. 11 is provided with a first laminated glass member 22, a second laminated glass member 23 and an interlayer film 1 arranged between the first laminated glass member 22 and the second laminated glass member 23. The interlayer film 1 is sandwiched between the first laminated glass member 22 and the second laminated glass member 23. The first laminated glass member 22 is layered on a first surface (one surface) of the interlayer film 1. The second laminated glass member 23 is layered on a second surface (the other surface) opposite to the first surface of the interlayer film 1.

Examples of the first and second laminated glass members include a glass plate and a PET (polyethylene terephthalate) film and the like. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate, and it is preferred that at least one glass plate be used.

Examples of the glass plate include a sheet of inorganic glass and a sheet of organic glass. Examples of the inorganic glass include float plate glass, heat ray absorbing plate glass, heat ray-reflecting plate glass, polished plate glass, figured glass, net-reinforced plate glass, wired plate glass, clear glass, and the like. The organic glass is synthetic resin glass substituted for inorganic glass. Examples of the organic glass include a polycarbonate plate, a poly (meth) acrylic resin plate, and the like. Examples of the poly(meth)acrylic resin plate include a polymethyl (meth)acrylate plate, and the like.

Although the thickness of the laminated glass member is not particularly limited, the thickness is preferably greater than or equal to 1 mm, preferably less than or equal to 5 mm, and more preferably less than or equal to 3 mm. Moreover, in the case where the laminated glass member is a glass plate, the thickness of the glass plate is preferably greater than or equal to 1 mm, preferably less than or equal to 5 mm, and more preferably less than or equal to 3 mm. In the case where the laminated glass member is a PET film, the thickness of the PET film is preferably greater than or equal to 0.03 mm and preferably less than or equal to 0.5 mm.

The production method of the laminated glass is not particularly limited. For example, the interlayer film is sandwiched between the first and second laminated glass members and the air remaining between each of the first and second laminated glass members and the interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The interlayer film and the laminated glass can be used for automobiles, railway vehicles, aircraft, ships, buildings and the like. It is preferred that the interlayer film be an interlayer film for construction or for vehicles. It is preferred that the laminated glass be laminated glass for construction or for vehicles.

Hereinafter, the present invention will be described in more detail with reference to examples. The present invention is not limited only to the following examples.

EXAMPLE 1

(Preparation of First Resin Composition for Forming First Resin Layer A (First Surface Layer) and First Resin Layer B (Second Surface Layer))

Polyvinyl butyral A (the acetylation degree of 1% by mole, the butyralization degree of 69% by mole, the content of the hydroxyl group of 30% by mole) obtained by acetalizing polyvinyl alcohol (the average polymerization degree of 1700) with n-butyraldehyde was prepared. To 100 parts by mass of this Polyvinyl butyral A, 39 parts by mass of triethylene glycol-di-2-ethylhexanoate (a plasticizer, 3GO) was added and thoroughly kneaded with a mixing roll to obtain a first resin composition.

(Preparation of Second Resin Composition for Forming Second Resin Layer (Intermediate Layer))

To 100 parts by mass of the Polyvinyl butyral A, 40 parts by mass of triethylene glycol-di-2-ethylhexanoate (a plasticizer, 3GO) and calcium carbonate particles (inorganic particles, the weight average particle diameter of 5.0 μm) in an amount that the content thereof in 100% by mass of the resulting resin composition becomes 5.9% by mass were added and thoroughly kneaded with a mixing roll to obtain a second resin composition.

(Preparation of Interlayer Film for Laminated Glass)

The second resin composition was supplied to a main extruder. Moreover, the first resin composition was supplied to a sub-extruder. By attaching a multi-layer feed block to the tip end of each of the main extruder and the sub-extruder to perform the coextrusion, an interlayer film having two first resin layers and a second resin layer embedded between the two first resin layers in the dark color part and the gradation part and having a first resin layer in the transparent part was obtained. In this connection, with regard to the boundary between the dark color part and the gradation part in the obtained interlayer film, at the time of preparing laminated glass described below and measuring the parallel light transmittance, a portion where the parallel light transmittance is 30% is defined as the boundary, an area where the parallel light transmittance is less than or equal to 30% is defined as the dark color part, and an area where the parallel light transmittance is greater than 30% and less than 60% is defined as the gradation part. The thicknesses of respective layers in the obtained interlayer film are shown in the following Table 1.

In this connection, with regard to the thicknesses of respective layers in the interlayer film, the interlayer film was cut with a sharp razor blade so that the cross-section of the dark color part, the gradation part and the transparent part in the layered direction including the dark color part, the gradation part and the transparent part is exposed, after which the exposed cross-section of the interlayer film was observed with a digital microscope ("DSX500" available from Olympus Corporation) to measure the thicknesses of respective layers in the interlayer film with a micro gauge. Moreover, the shape of the exposed cross-section of the interlayer film was the shape corresponding to that in FIG. 1 (the shape similar to that in FIG. 1).

Moreover, the area density of inorganic particles in the thickest portion of the second resin layer of the interlayer film was measured in the following manner.

The interlayer film was cut in the thickness direction so that the thickest portion of the second resin layer was situated at the center of the resulting sample to obtain a sample with a rectangular planar shape. The resulting sample was allowed to have a length of the short side of 1 cm, a thickness corresponding to the thickness of the interlayer film, and a length of the long side that the mass of the sample becomes 1 g. The long-side direction in the resulting sample was a direction orthogonal to the direction connecting the thickest portion of the second resin layer and a portion of the transparent part situated nearest to the thickest portion of the second resin layer.

To the obtained sample was added 18 mL of an aqueous 70% by mass nitric acid solution, and the sample was held in place for 30 minutes at 200° C. using a microwave sample pretreatment apparatus ("ETHOS One" available from Milestone General K. K.) to be thermally decomposed, after which the sample was made up to a prescribed volume with ultrapure water having a specific resistance of 18.2 MΩ·cm under a condition of 25° C. to obtain a test liquid. Next, by means of a high frequency inductively coupled plasma emission spectrometer ("ICPE-9000" available from SHI- MADZU CORPORATION), the calcium in the test liquid was quantitatively analyzed, and from the obtained value of the calcium content, the area density of calcium carbonate particles was calculated.

(Preparation of Laminated Glass)

Two sheets of clear glass (100 cm in longitudinal length by 30 cm in transversal length by 2.5 mm in thickness) in accordance with JIS R3202 (1996) were prepared. The above-mentioned interlayer film obtained was sandwiched between the two sheets of clear glass from both ends to obtain a laminate. This laminate was put into a rubber bag and degassed for 20 minutes at a degree of vacuum of 2.6 kPa, after which the laminate was transferred into an oven while being degassed, and furthermore, held in place for 30 minutes at 90° C. and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of laminated glass.

Examples 2 to 12 and Comparative Example 1

An interlayer film and a sheet of laminated glass were prepared in the same manner as that in Example 1 except that the content of calcium carbonate particles was set to that listed in the following Tables 1 and 2, and the lengths and thicknesses of respective layers in the resulting interlayer film were set to those listed in the following Tables 1 and 2, at the time of preparing the interlayer film.

Comparative Examples 2, 3

An interlayer film and a sheet of laminated glass were prepared in the same manner as that in Example 1 except that the multi-layer feed block was modified to obtain the interlayer film which has a three-layer structure allowing a first resin layer, a second resin layer and a first resin layer to be layered in this order in the thickness direction over the whole area of the interlayer film and does not have a transparent layer, and the thicknesses of respective layers in the resulting interlayer film were set to those listed in the following Table 2, at the time of preparing the interlayer film. In this connection, with regard to the boundary between the dark color part and the gradation part in the interlayer film obtained in Examples 2 to 12, at the time of measuring the parallel light transmittance of the sheet of laminated glass obtained in Examples 2 to 12, a portion where the parallel light transmittance is 30% is defined as the boundary, an area where the parallel light transmittance is less than or equal to 30% is defined as the dark color part, and an area where the parallel light transmittance is greater than 30% and less than 60% is defined as the gradation part. Moreover, with regard to the boundary between the gradation part and the transparent part in the interlayer film obtained in Examples 8 to 12, at the time of measuring the parallel light transmittance of the sheet of laminated glass obtained in Examples 8 to 12, a portion where the parallel light transmittance is 60% is defined as the boundary, an area where the parallel light transmittance is greater than 30% and less than 60% is defined as the gradation part, and an area where the parallel light transmittance is greater than or equal to 60% is defined as the transparent part. Moreover, the sheet of laminated glass obtained in Comparative Example 1 did not have an area where the parallel light transmittance is less than or equal to 30%, that is, a dark color part. In this connection, in Comparative Example 1, at the time of measuring the parallel light transmittance of the sheet of laminated glass obtained in Comparative Example 1, an area where the parallel light transmittance is greater than or equal to 60% is defined as the transparent part.

Examples 13 to 25, Comparative Examples 4, 5

An interlayer film and a sheet of laminated glass were prepared in the same manner as that in Example 1 except that the shape of the cross-section of the interlayer film was changed to that listed in the following Tables 3 and 4, the content of calcium carbonate particles and the content of the plasticizer were set to those listed in the following Tables 3 and 4, and the lengths and thicknesses of respective layers in the resulting interlayer film were set to those listed in the following Tables 3 and 4, at the time of preparing the interlayer film. In this connection, in Examples 11 to 16 and Comparative Example 7, the shape of the exposed cross-section of the interlayer film was the shape corresponding to that in FIG. 4 (the shape similar to that in FIG. 4). In Examples 17 to 22 and Comparative Examples 8 and 9, the shape of the exposed cross-section of the interlayer film was the shape corresponding to that in FIG. 5 (the shape similar to that in FIG. 5). In this connection, with regard to the boundary between the dark color part and the gradation part in the interlayer film obtained in Examples 13 to 25, at the time of measuring the parallel light transmittance of the sheet of laminated glass obtained in Examples 13 to 25, a portion where the parallel light transmittance is 30% is defined as the boundary, an area where the parallel light transmittance is less than or equal to 30% is defined as the dark color part, and an area where the parallel light transmittance is greater than 30% and less than 60% is defined as the gradation part. Moreover, with regard to the boundary between the gradation part and the transparent part in the interlayer film obtained in Examples 13 to 25, at the time of measuring the parallel light transmittance of the sheet of laminated glass obtained in Examples 13 to 25, a portion where the parallel light transmittance is 60% is defined as the boundary, an area where the parallel light transmittance is greater than 30% and less than 60% is defined as the gradation part, and an area where the parallel light transmittance is greater than or equal to 60% is defined as the transparent part. Moreover, the sheets of laminated glass obtained in Comparative Example 4 and Comparative Example 5 did not have an area where the parallel light transmittance is less than or equal to 30%, that is, a dark color part. In this connection, in Comparative Example 4 and Comparative Example 5, at the time of measuring the parallel light transmittance of the sheet of laminated glass obtained in Comparative Example 4 and Comparative Example 5, an area where the parallel light transmittance is greater than or equal to 60% is defined as the transparent part.

Example 26

(Preparation of First Resin Composition for Forming First Resin Layer (Intermediate Layer))

Polyvinyl butyral A (the acetylation degree of 1% by mole, the butyralization degree of 69% by mole, the content of the hydroxyl group of 30% by mole) obtained by acetalizing polyvinyl alcohol (the average polymerization degree of 1700) with n-butyraldehyde was prepared. To 100 parts by mass of this Polyvinyl butyral A, 39 parts by mass of triethylene glycol-di-2-ethylhexanoate (a plasticizer, 3GO) was added and thoroughly kneaded with a mixing roll to obtain a first resin composition.

(Preparation of Second Resin Composition for Forming Second Resin Layer A (First Surface Layer) and Second Resin Layer B (Second Surface Layer))

To 100 parts by mass of the Polyvinyl butyral A, 40 parts by mass of triethylene glycol-di-2-ethylhexanoate (a plasticizer, 3GO) and calcium carbonate particles (inorganic particles, the weight average particle diameter of 5.0 µm) in an amount that the content thereof in 100% by mass of the resulting resin composition becomes 0.679% by mass were added and thoroughly kneaded with a mixing roll to obtain a second resin composition.

(Preparation of Interlayer Film for Laminated Glass)

The first resin composition was supplied to a main extruder. Moreover, the second resin composition was supplied to a sub-extruder. By attaching a multi-layer feed block to the tip end of each of the main extruder and the sub-extruder to perform the coextrusion, an interlayer film having two second resin layers and a first resin layer embedded between the two second resin layers in the transparent part and the gradation part and having a second resin layer in the dark color part was obtained. The thicknesses of respective layers in the obtained interlayer film are shown in the following Table 5.

In this connection, with regard to the thicknesses of respective layers in the interlayer film, the interlayer film was cut with a sharp razor blade so that the cross-section of the dark color part, the gradation part and the transparent part in the layered direction including the dark color part, the gradation part and the transparent part is exposed, after which the exposed cross-section of the interlayer film was observed with a digital microscope ("DSX500" available from Olympus Corporation) to measure the thicknesses of respective layers in the interlayer film with a micro gauge. Moreover, the shape of the exposed cross-section of the interlayer film was the shape corresponding to that in FIG. 7 (the shape similar to that in FIG. 7).

Moreover, the area density of inorganic particles in the portion where the total thickness of the two second resin layers is the thickest in the interlayer film was measured in the following manner.

The interlayer film was cut in the thickness direction so that the portion where the total thickness of the two second resin layers is the thickest was situated at the center of the resulting sample to obtain a sample with a rectangular planar shape. The resulting sample was allowed to have a length of the short side of 1 cm, a thickness corresponding to the thickness of the interlayer film, and a length of the long side that the mass of the sample becomes 1 g. The long-side direction in the resulting sample was a direction orthogonal to the direction connecting the thickest portion of the two second resin layers and a portion of the transparent part situated nearest to the thickest portion of the two second resin layers.

To the obtained sample was added 18 mL of an aqueous 70% by mass nitric acid solution, and the sample was held in place for 30 minutes at 200° C. using a microwave sample pretreatment apparatus ("ETHOS One" available from Milestone General K. K.) to be thermally decomposed, after which the sample was made up to a prescribed volume with ultrapure water having a specific resistance of 18.2 MΩ·cm under a condition of 25° C. to obtain a test liquid. Next, by means of a high frequency inductively coupled plasma emission spectrometer ("ICPE-9000" available from SHIMADZU CORPORATION), the calcium in the test liquid was quantitatively analyzed, and from the obtained value of the calcium content, the area density of calcium carbonate particles was calculated.

Moreover, the area density of inorganic particles in the portion where the total thickness of the two second resin layers is the thinnest in the interlayer film was measured in the following manner.

The interlayer film was cut in the thickness direction so that the portion where the total thickness of the two second resin layers is the thinnest was situated at the center of the resulting sample to obtain a sample with a rectangular planar shape. The resulting sample was allowed to have a length of the short side of 1 cm, a thickness corresponding to the thickness of the interlayer film, and a length of the long side that the mass of the sample becomes 1 g. The long-side direction in the resulting sample was a direction orthogonal to the direction connecting the thinnest portion of the two second resin layers and a portion of the dark color part situated nearest to the thinnest portion of the two second resin layers. The obtained sample was quantitatively analyzed for the calcium in the same procedure as that for the measurement of the area density at the portion where the total thickness of the two second resin layers is the thinnest, and from the obtained value of the calcium content, the area density of calcium carbonate particles was calculated.

(Evaluation)

(1) Parallel Light Transmittance (Tv)

The parallel light transmittance (Tv) was measured in accordance with JIS R3106 (1998). The obtained laminated glass was installed on the light path between a light source and an integrating sphere, in parallel to the normal line of the optical axis and at a point apart from the integrating sphere by 13 cm so that only the transmitted parallel light was received by the integrating sphere using a spectrophotometer ("U-4100" available from Hitachi High-Technologies Corporation). The spectral transmittance was measured in this state. The visible light transmittance calculated from the obtained spectral transmittance was defined as the parallel light transmittance. The parallel light transmittance of the laminated glass obtained in each of Examples was less than or equal to 30% in a portion of the dark color part and was greater than or equal to 60% in a portion of the transparent part. Among values of the obtained parallel light transmittance, the minimum value of the parallel light transmittance in a portion of the dark color part and the maximum value of the parallel light transmittance in a portion of the transparent part are shown in Tables 1 to 5. In this connection, since the sheets of laminated glass obtained in Comparative Example 1, Comparative Example 4 and Comparative Example 5 do not have a dark color part, the minimum values of the parallel light transmittance of the obtained laminated glass are shown in the columns for the parallel light transmittance of the dark color part in Table 2, Table 3 and Table 4.

(2) Total Light Transmittance (TvD)

The total light transmittance (TvD) was measured in accordance with JIS R3106 (1998). The obtained laminated glass was installed in parallel to and brought into close contact with an opening part of an integrating sphere so that all light rays transmitted were received by the integrating sphere using a spectrophotometer ("U-4100" available from Hitachi High-Technologies Corporation) to measure the spectral transmittance. The visible light transmittance calculated from the obtained spectral transmittance was defined as the total light transmittance. Among values of the obtained total light transmittance, the minimum value of the total light transmittance in the dark color part and the maximum value of the total light transmittance in the transparent part are shown in Tables 1 to 5. In this connection, since the sheets of laminated glass obtained in Comparative Example 1, Comparative Example 4 and Comparative Example 5 do not have a dark color part, the minimum values of the total light transmittance of the obtained laminated glass are shown in the columns for the minimum value of the total light transmittance of the dark color part in Table 2, Table 3 and Table 4.

(3) Evaluation of Color Irregularity of Gradation—Visual Observation

The obtained laminated glass was arranged on a light table, and a portion of the gradation part of the laminated glass in a state of being irradiated with light from the fluorescent lamp in the light table was visually observed for the gradation pattern from the opposite side of the light source. By the above-mentioned observation method, 10 respondents observed the obtained laminated glass, and the color irregularity of the gradation determined by the visual observation was evaluated according to the following criteria. Furthermore, a white film on which a lattice pattern of 1 cm square is printed was arranged between the laminated glass and the light table, the laminated glass was arranged at a distance of 1.5 cm from the film parallel to the laminated glass in the thickness direction of the laminated glass, and the laminated glass in a state of being irradiated with light from the fluorescent lamp from the upper side of the sheet of laminated glass was observed for the gradation pattern.

[Criteria for Judgment in Color Irregularity of Gradation by Visual Observation]

Two circles: There is no color streak: The number of respondents who judged that there are a few color streaks is less than or equal to 2.

Circle: There is almost no color streak: The number of respondents who judged that there are a few color streaks is greater than or equal to 3 and less than or equal to 4.

X mark: There are color streaks: The number of respondents who judged that there are a few color streaks is greater than or equal to 5.

(4) Evaluation of Color Irregularity of Gradation Transmittance Measurement

The obtained laminated glass was measured for the parallel light transmittance (Tv) and the total light transmittance (TvD) at 1-cm intervals in a linear direction from the dark color part side to the transparent part side in a portion of the gradation part of the laminated glass. The color irregularity of the gradation determined by the transmittance measurement was evaluated according to the following criteria.

[Criteria for Judgment in Color Irregularity of Gradation by Transmittance Measurement]

Circle: Along the direction from the dark color part side to the transparent part side, the Tv value and the TvD value are continuously decreased.

X mark: Along the direction from the dark color part side to the transparent part side, the Tv value and the TvD value are not continuously decreased.

(5) Evaluation of Parallel Light Transmittance of Laminated Glass

The parallel light transmittance of the obtained laminated glass was evaluated according to the following criteria.

Circle: The interlayer film has a dark color part, a gradation part and a transparent part, the parallel light transmittance in a portion of the dark color part of the laminated glass is less than or equal to 30%, the parallel light transmittance in a portion of the gradation part of the laminated glass is continuously increased from the dark color part side to the transparent part side, and the parallel light transmittance in a portion of the transparent part of the laminated glass is greater than or equal to 60%.

X mark: The laminated glass does not satisfy the criteria for judgment of the Circle.

(6) Measurement of Complex Viscosity

The complex viscosities of the first resin layer and the second resin layer of the obtained interlayer film for laminated glass were measured according to the following procedure. With regard to the obtained interlayer film for laminated glass, at the end of 1 hour after being formed into a film, the first resin layer and the second resin layer were peeled off from each other and the first resin layer was removed. In a molding flask (2 cm in longitudinal length by 2 cm in transversal length by 0.76 mm in thickness) arranged between two sheets of polyethylene terephthalate (PET) films, 1 g of the first resin layer peeled off was placed and preheated for 10 minutes at a temperature of 150° C. and under a pressure of 0 kg/cm$^2$, and then press-molded for 15 minutes under a pressure of 80 kg/cm$^2$. Afterward, in a hand press machine previously set to 20° C., the press-molded first resin layer was installed and pressed for 10 minutes at 10 MPa to be cooled. Then, from the molding flask arranged between the two sheets of PET films, one sheet of the PET film was peeled off, and the press-molded product was stored for 24 hours in a constant-temperature and constant-humidity chamber (a humidity of 30% (±3%), a temperature of 23° C.), and then measured for the viscoelasticity, using the ARES-G2 available from TA Instruments Japan Inc., in accordance with JIS K7244-10 (ISO6721-10) to measure the complex viscosity. As a jig used at the time of the viscoelasticity measurement, a parallel plate with a diameter of 8 mm was used. Moreover, the viscoelasticity measurement was performed under conditions of a frequency of 1 Hz and a strain of 8% at the measurement temperature of 200° C. The obtained complex viscosity was read as a value of the complex viscosity of the first resin layer at 200° C. Moreover, the complex viscosity of the second resin layer was measured in the same manner.

The results are shown in the following Tables 1 to 5.

TABLE 1

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Ingredients to be blended | First resin layer A (first surface layer) | Thermoplastic resin | Parts by mass | 100 | 100 | 100 | 100 | 100 | 100 | 100 | 100 |
| | | Plasticizer | Parts by mass | 39 | 39 | 39 | 39 | 39 | 39 | 39 | 39 |
| | | Calcium carbonate | % by mass | 0 | 0 | 0 | 0 | 0 | 0 | 0 | 0.24 |
| | Second resin layer (intermediate layer) | Thermoplastic resin | Parts by mass | 100 | 100 | 100 | 100 | 100 | 100 | 100 | 100 |
| | | Plasticizer | Parts by mass | 40 | 40 | 40 | 40 | 40 | 40 | 40 | 40 |
| | | Calcium carbonate | % by mass | 5.9 | 5.7 | 7.0 | 20.0 | 1.8 | 16.5 | 2.8 | 5.9 |
| | | Area density g/m² | | 19.2 | 17.5 | 21.7 | 59.9 | 5.4 | 19.2 | 19.2 | 19.2 |
| | First resin layer B (second surface layer) | Thermoplastic resin | Parts by mass | 100 | 100 | 100 | 100 | 100 | 100 | 100 | 100 |
| | | Plasticizer | Parts by mass | 39 | 39 | 39 | 39 | 39 | 39 | 39 | 39 |
| | | Calcium carbonate | % by mass | 0 | 0 | 0 | 0 | 0 | 0 | 0 | 0.12 |
| Complex viscosity η 1 of respective first resin layers A, B | | Pa·s | | 7750 | 7750 | 7750 | 7750 | 7750 | 7750 | 7750 | 7750 |
| Complex viscosity η 2 of second resin layer | | Pa·s | | 9450 | 9400 | 9700 | 12050 | 9400 | 11800 | 8300 | 9450 |
| Complex viscosity ratio (η 2/η 1) | | | | 1.22 | 1.21 | 1.25 | 1.55 | 1.21 | 1.52 | 1.07 | 1.22 |
| Evaluation | Shape of interlayer film (only the shape corresponds thereto in the comparative example) | | | FIG. 1 | FIG. 1 | FIG. 1 | FIG. 1 | FIG. 1 | FIG. 1 | FIG. 1 | FIG. 1 |
| | Dark color part 11 | Minimum value of parallel light transmittance | % | 1.1 | 1.4 | 0.8 | 0.0 | 20.0 | 1.1 | 1.0 | 1.0 |
| | | Maximum value of thickness of total light transmittance | % | 61.0 | 63.0 | 56.0 | 8.0 | 81.0 | 62.0 | 60.0 | 56.0 |
| | | Length of dark color part (L1) | mm | 610 | 600 | 620 | 680 | 400 | 600 | 610 | 600 |
| | | Maximum value of thickness of first resin layers (T1 + T2) | mm | 0.73 | 0.74 | 0.73 | 0.63 | 0.55 | 0.76 | 0.68 | 0.76 |
| | | Minimum value of thickness of first resin layers (T1 + T2) | mm | 0.47 | 0.47 | 0.47 | 0.47 | 0.47 | 0.65 | 0.15 | 0.52 |
| | | Maximum value of thickness of second resin layer (T3) | mm | 0.29 | 0.29 | 0.29 | 0.28 | 0.28 | 0.11 | 0.60 | 0.29 |
| | | Minimum value of thickness of second resin layer (T3) | mm | 0.05 | 0.05 | 0.05 | 0.02 | 0.23 | 0.02 | 0.10 | 0.043 |
| | Gradation part 12 | Length of gradation part (L2) | mm | 90 | 90 | 90 | 15 | 300 | 92 | 88 | 90 |
| | | Maximum value of thickness of first resin layers (T1 + T2) | mm | 0.78 | 0.79 | 0.79 | 0.77 | 0.8 | 0.79 | 0.79 | 0.79 |
| | | Minimum value of thickness of first resin layers (T1 + T2) | mm | 0.73 | 0.74 | 0.74 | 0.63 | 0.55 | 0.76 | 0.68 | 0.76 |
| | | Evaluation of color irregularity of gradation: visual observation | | ∘∘ | ∘∘ | ∘∘ | ∘∘ | ∘∘ | ∘∘ | ∘∘ | ∘∘ |
| | | Evaluation of color irregularity of gradation: transmittance measurement | | ∘ | ∘ | ∘ | ∘ | ∘ | ∘ | ∘ | ∘ |
| | Transparent part 13 | Maximum value of parallel light transmittance | % | 78.5 | 78.5 | 78.5 | 78.5 | 78.5 | 78.5 | 78.5 | 61 |
| | | Maximum value of total light transmittance | % | 88.5 | 88.5 | 88.5 | 88.5 | 88.5 | 88.5 | 88.5 | 86 |
| | | Length of transparent part (L3) | mm | 1900 | 1900 | 1900 | 1900 | 1900 | 1900 | 1900 | 1900 |
| | | Maximum value of thickness of first resin layers (T1 + T2) | mm | 0.82 | 0.83 | 0.82 | 0.83 | 0.82 | 0.82 | 0.82 | 0.83 |
| | | Minimum value of thickness of first resin layers (T1 + T2) | mm | 0.74 | 0.75 | 0.75 | 0.76 | 0.75 | 0.75 | 0.75 | 0.79 |
| | | Maximum value of thickness of second resin layer (T3) | mm | — | — | — | — | — | — | — | 0.014 |
| | | Minimum value of thickness of second resin layer (T3) | mm | — | — | — | — | — | — | — | 0.00 |
| Evaluation of parallel light transmittance of laminated glass | | | | ∘ | ∘ | ∘ | ∘ | ∘ | ∘ | ∘ | ∘ |

TABLE 2

| Ingredients to be blended | | | Ex. 9 | Ex. 10 | Ex. 11 | Ex. 12 | Comp. Ex. 1 | Comp. Ex. 2 | Comp. Ex. 3 |
|---|---|---|---|---|---|---|---|---|---|
| | First resin layer A (first surface layer) | Thermoplastic resin | Parts by mass | 100 | 100 | 100 | 100 | 100 | 100 | 100 |
| | | Plasticizer | Parts by mass | 39 | 35 | 42 | 35 | 39 | 39 | 39 |
| | | Calcium carbonate | % by mass | 0 | 0 | 0 | 0 | 0 | 0 | 0 |
| | Second resin layer (intermediate layer) | Thermoplastic resin | Parts by mass | 100 | 100 | 100 | 100 | 100 | 100 | 100 |
| | | Plasticizer | Parts by mass | 30 | 48 | 30 | 40 | 40 | 40 | 40 |
| | | Calcium carbonate | % by mass | 16.5 | 2.8 | 5.9 | 5.9 | 0.9 | 16.7 | 5.9 |
| | | | Area density g/m² | 19.2 | 19.2 | 19.2 | 19.2 | 2.9 | 18.7 | 19.2 |
| | First resin layer B (second surface layer) | Thermoplastic resin | Parts by mass | 100 | 100 | 100 | 100 | 100 | 100 | 100 |
| | | Plasticizer | Parts by mass | 39 | 35 | 42 | 35 | 39 | 39 | 39 |
| | | Calcium carbonate | % by mass | 0 | 0 | 0 | 0 | 0 | 0 | 0 |
| Complex viscosity η 1 of respective first resin layers A, B | | | Pa·s | 7750 | 9172 | 6700 | 9180 | 7750 | 7750 | 7750 |
| Complex viscosity η 2 of second resin layer | | | Pa·s | 17014 | 6200 | 13600 | 9450 | 7800 | 11900 | 9450 |
| Complex viscosity ratio (η 2/η 1) | | | | 2.20 | 0.68 | 2.03 | 1.03 | 1.01 | 1.54 | 1.22 |
| Evaluation | Shape of interlayer film (only the shape corresponds thereto in the comparative example) | | | FIG. 1 | FIG. 1 | FIG. 1 | FIG. 1 | FIG. 1 | — | — |
| | Dark color part 11 | Minimum value of parallel light transmittance | % | 1.1 | 1.0 | 1.1 | 1.1 | 32.0 | 0.9 | 1.1 |
| | | Minimum value of total light transmittance | % | 62.0 | 60.0 | 61.0 | 61.0 | 84.5 | 60.0 | 61.0 |
| | | Length of dark color part (L1) | mm | 600 | 610 | 610 | 610 | — | — | — |
| | | Maximum value of thickness of first resin layers (T1 + T2) | mm | 0.76 | 0.70 | 0.73 | 0.74 | 0.54 | 0.80 | 0.82 |
| | | Minimum value of thickness of first resin layers (T1 + T2) | mm | 0.68 | 0.21 | 0.50 | 0.51 | 0.47 | 0.73 | 0.75 |
| | | Maximum value of thickness of second resin layer (T3) | mm | 0.11 | 0.60 | 0.29 | 0.29 | 0.29 | 0.14 | 0.29 |
| | | Minimum value of thickness of second resin layer (T3) | mm | 0.017 | 0.092 | 0.048 | 0.048 | — | 0.06 | 0.22 |
| | Gradation part 12 | Length of gradation part (L2) | mm | 92 | 88 | 86 | 90 | — | — | — |
| | | Maximum value of thickness of first resin layers (T1 + T2) | mm | 0.79 | 0.79 | 0.78 | 0.78 | — | — | — |
| | | Minimum value of thickness of first resin layers (T1 + T2) | mm | 0.76 | 0.70 | 0.73 | 0.74 | — | — | — |
| | | Evaluation of color irregularity of gradation: visual observation | | ○ | ○ | ○ | ○○ | — | — | — |
| | | Evaluation of color irregularity of gradation: transmittance measurement | | ○ | ○ | ○ | ○ | — | — | — |
| | Transparent part 13 | Maximum value of parallel light transmittance | % | 78.5 | 78.5 | 78.5 | 78.5 | 78.5 | — | — |
| | | Maximum value of total light transmittance | % | 88.5 | 88.5 | 88.5 | 88.5 | 88.5 | — | — |
| | | Length of transparent part (L3) | mm | 1900 | 1900 | 1900 | 1900 | 1900 | — | — |
| | | Maximum value of thickness of first resin layers (T1 + T2) | mm | 0.82 | 0.82 | 0.82 | 0.82 | 0.82 | — | — |
| | | Minimum value of thickness of first resin layers (T1 + T2) | mm | 0.79 | 0.77 | 0.77 | 0.79 | 0.75 | — | — |
| | | Maximum value of thickness of second resin layer (T3) | mm | 0.006 | 0.030 | 0.016 | 0.016 | — | — | — |
| | | Minimum value of thickness of second resin layer (T3) | mm | 0 | 0 | 0 | 0 | — | — | — |
| Evaluation of parallel light transmittance of laminated glass | | | | ○ | ○ | ○ | ○ | × | × | × |

TABLE 3

| | | | Ex. 13 | Ex. 14 | Ex. 15 | Ex. 16 | Ex. 17 | Ex. 18 | Comp. Ex. 4 |
|---|---|---|---|---|---|---|---|---|---|
| Ingredients to be blended | First resin layer A (first surface layer) | Thermoplastic resin | Parts by mass | 100 | 100 | 100 | 100 | 100 | 100 | 100 |
| | | Plasticizer | Parts by mass | 39 | 39 | 39 | 39 | 39 | 39 | 39 |
| | | Calcium carbonate | % by mass | 0 | 0 | 0 | 0 | 0 | 0 | 0 |
| | Second resin layer (intermediate layer) | Thermoplastic resin | Parts by mass | 100 | 100 | 100 | 100 | 100 | 100 | 100 |
| | | Plasticizer | Parts by mass | 40 | 40 | 40 | 40 | 40 | 40 | 30 |
| | | Calcium carbonate | % by mass | 5.9 | 20.0 | 1.8 | 16.5 | 2.8 | 5.9 | 16.5 |
| | | | Area density g/m² | 19.2 | 59.92 | 5.4 | 19.2 | 19.2 | 19.2 | 19.2 |
| | First resin layer B (second surface layer) | Thermoplastic resin | Parts by mass | 100 | 100 | 100 | 100 | 100 | 100 | 100 |
| | | Plasticizer | Parts by mass | 39 | 39 | 39 | 39 | 39 | 39 | 39 |
| | | Calcium carbonate | % by mass | 0 | 0 | 0 | 0 | 0 | 0 | 0 |
| Complex viscosity η1 of respective first resin layers A, B | | | Pa·s | 7750 | 7750 | 7750 | 7750 | 7750 | 7750 | 7750 |
| Complex viscosity η2 of second resin layer | | | Pa·s | 9450 | 12050 | 9400 | 11800 | 8300 | 9450 | 17014 |
| Complex viscosity ratio (η2/η1) | | | | 1.22 | 1.55 | 1.21 | 1.52 | 1.07 | 1.22 | 2.20 |
| Evaluation | Shape of interlayer film (only the shape corresponds thereto in the comparative example) | | | FIG. 4 | FIG. 4 | FIG. 4 | FIG. 4 | FIG. 4 | FIG. 4 | FIG. 4 |
| | Dark color part 11Ca | Minimum value of parallel light transmittance | % | 1.1 | 0.0 | 20.0 | 1.1 | 1.0 | 1.1 | 32 |
| | | Minimum value of total light transmittance | % | 61.0 | 8.0 | 81.0 | 62.0 | 60.0 | 61 | 84.5 |
| | | Length of dark color part (L1) | mm | 610 | 680 | 400 | 600 | 610 | 610 | — |
| | | Maximum value of thickness of first resin layers (T1 + T2) | mm | 0.77 | 0.79 | 0.61 | 0.79 | 0.70 | 0.77 | 0.54 |
| | | Minimum value of thickness of first resin layers (T1 + T2) | mm | 0.52 | 0.54 | 0.54 | 0.71 | 0.21 | 0.52 | 0.49 |
| | | Maximum value of thickness of second resin layer (T3) | mm | 0.29 | 0.28 | 0.28 | 0.11 | 0.60 | 0.29 | 0.29 |
| | | Minimum value of thickness of second resin layer (T3) | mm | 0.045 | 0.015 | 0.193 | 0.017 | 0.092 | 0.045 | — |
| | Gradation part 12Ca | Length of gradation part (L2) | mm | 90 | 15 | 300 | 92 | 88 | 90 | — |
| | | Maximum value of thickness of first resin layers (T1 + T2) | mm | 0.78 | 0.77 | 0.8 | 0.79 | 0.79 | 0.78 | — |
| | | Minimum value of thickness of first resin layers (T1 + T2) | mm | 0.77 | 0.79 | 0.61 | 0.79 | 0.70 | 0.77 | — |
| | | Evaluation of color irregularity of gradation: visual observation | | ∘∘ | ∘∘ | ∘∘ | ∘∘ | ∘∘ | ∘∘ | — |
| | | Evaluation of color irregularity of gradation: transmittance measurement | | ∘ | ∘ | ∘ | ∘ | ∘ | ∘ | — |

TABLE 3-continued

| | | | Ex. 13 | Ex. 14 | Ex. 15 | Ex. 16 | Ex. 17 | Ex. 18 | Comp. Ex. 4 |
|---|---|---|---|---|---|---|---|---|---|
| Transparent part 13C | Maximum value of parallel light transmittance | % | 78.5 | 78.5 | 78.5 | 78.5 | 78.5 | 78.5 | 78.5 |
| | Maximum value of total light transmittance | % | 88.5 | 88.5 | 88.5 | 88.5 | 88.5 | 88.5 | 88.5 |
| | Length of transparent part (L3) | mm | 1400 | 1400 | 1400 | 1400 | 1400 | 1700 | 1900 |
| | Maximum value of thickness of first resin layers (T1 + T2) | mm | 0.82 | 0.83 | 0.82 | 0.82 | 0.82 | 0.82 | 0.82 |
| | Minimum value of thickness of first resin layers (T1 + T2) | mm | 0.79 | 0.76 | 0.75 | 0.79 | 0.78 | 0.79 | 0.79 |
| | Maximum value of thickness of second resin layer (T3) | mm | 0.015 | 0.050 | 0.063 | 0.006 | 0.030 | 0.015 | 0.01 |
| | Minimum value of thickness of second resin layer (T3) | mm | 0.00 | 0.00 | 0.00 | 0.00 | 0.00 | 0 | 0.00 |
| Gradation part 12Cb | Length of gradation part (L2) | mm | 90 | 15 | 300 | 92 | 88 | 90 | — |
| | Maximum value of thickness of first resin layers (T1 + T2) | mm | 0.78 | 0.77 | 0.8 | 0.79 | 0.79 | 0.78 | — |
| | Minimum value of thickness of first resin layers (T1 + T2) | mm | 0.77 | 0.79 | 0.61 | 0.79 | 0.70 | 0.77 | — |
| | Evaluation of color irregularity of gradation: visual observation | | ○○ | ○○ | ○○ | ○○ | ○○ | ○○ | — |
| | Evaluation of color irregularity of gradation: transmittance measurement | | ○ | ○ | ○ | ○ | ○ | ○ | — |
| Dark color part 11Cb | Minimum value of parallel light transmittance | % | 1.1 | 0.0 | 20.0 | 1.1 | 1.0 | 1.1 | 32 |
| | Minimum value of total light transmittance | % | 61.0 | 8.0 | 81.0 | 62.0 | 60.0 | 61 | 84.5 |
| | Length of dark color part (L1) | mm | 610 | 680 | 400 | 600 | 610 | 300 | — |
| | Maximum value of thickness of first resin layers (T1 + T2) | mm | 0.77 | 0.79 | 0.61 | 0.79 | 0.70 | 0.77 | 0.54 |
| | Minimum value of thickness of first resin layers (T1 + T2) | mm | 0.52 | 0.54 | 0.54 | 0.71 | 0.21 | 0.52 | 0.49 |
| | Maximum value of thickness of second resin layer (T3) | mm | 0.29 | 0.28 | 0.28 | 0.11 | 0.60 | 0.29 | 0.29 |
| | Minimum value of thickness of second resin layer (T3) | mm | 0.045 | 0.015 | 0.193 | 0.017 | 0.092 | 0.045 | — |
| Evaluation of parallel light transmittance of laminated glass | | | ○ | ○ | ○ | ○ | ○ | ○ | x |

TABLE 4

| | | | Ex. 19 | Ex. 20 | Ex. 21 | Ex. 22 | Ex. 23 | Ex. 24 | Ex. 25 | Comp. Ex. 5 |
|---|---|---|---|---|---|---|---|---|---|---|
| Ingredients to be blended | First resin layer A (first surface layer) | Thermoplastic resin — Parts by mass | 100 | 100 | 100 | 100 | 100 | 100 | 100 | 100 |
| | | Plasticizer — Parts by mass | 39 | 39 | 39 | 39 | 39 | 39 | 39 | 39 |
| | | Calcium carbonate — Parts by mass | 0 | 0 | 0 | 0 | 0 | 0 | 0 | 0 |
| | Second resin layer (intermediate layer) | Thermoplastic resin — Parts by mass | 100 | 100 | 100 | 100 | 100 | 100 | 100 | 100 |
| | | Plasticizer — Parts by mass | 40 | 40 | 40 | 40 | 40 | 40 | 30 | 40 |
| | | Calcium carbonate — Parts by mass | 5.9 | 16.5 | 2.8 | 5.9 | 5.9 | 5.9 | 16.5 | 0.9 |
| | | — % by mass | 19.2 | 19.2 | 19.2 | 19.2 | 19.2 | 19.2 | 19.2 | 2.9 |
| | | Area density g/m² | | | | | | | | |
| | First resin layer B (second surface layer) | Thermoplastic resin — Parts by mass | 100 | 100 | 100 | 100 | 100 | 100 | 100 | 100 |
| | | Plasticizer — Parts by mass | 39 | 39 | 39 | 39 | 39 | 39 | 39 | 39 |
| | | Calcium carbonate — Parts by mass | 0 | 0 | 0 | 0 | 0 | 0 | 0 | 0 |
| Complex viscosity η 1 of respective first resin layers A, B | | Pa · s | 8300 | 7750 | 7750 | 8300 | 8300 | 8300 | 7750 | 7750 |
| Complex viscosity η 2 of second resin layer | | Pa · s | 10000 | 11800 | 8300 | 10000 | 10000 | 10000 | 17014 | 7800 |
| Complex viscosity ratio (η 2/ η 1) | | | 1.20 | 1.52 | 1.07 | 1.20 | 1.20 | 1.20 | 2.20 | 1.01 |
| Evaluation | Shape of interlayer film (only the shape corresponds thereto in the comparative example) | | FIG. 5 | FIG. 5 | FIG. 5 | FIG. 5 | FIG. 5 | FIG. 5 | FIG. 5 | FIG. 5 |
| | Transparent part 13Da | Maximum value of parallel light transmittance % | 78.5 | 78.5 | 78.5 | 78.5 | 78.5 | 78.5 | 78.5 | 78.5 |
| | | Maximum value of total light transmittance % | 88.5 | 88.5 | 88.5 | 88.5 | 88.5 | 88.5 | 88.5 | 88.5 |
| | | Length of transparent part (L3) mm | 900 | 900 | 900 | 500 | 500 | 600 | 900 | 1900 |
| | | Maximum value of thickness of first resin layers (T1 + T2) mm | 0.82 | 0.82 | 0.82 | 0.82 | 0.82 | 0.82 | 0.82 | 0.82 |
| | | Minimum value of thickness of first resin layers (T1 + T2) mm | 0.79 | 0.79 | 0.78 | 0.79 | 0.79 | 0.79 | 0.79 | 0.75 |
| | | Maximum value of thickness of second resin layer mm (T3) | 0.015 | 0.006 | 0.030 | 0.015 | 0.015 | 0.015 | 0.006 | — |
| | | Minimum value of thickness of second resin layer mm (T3) | 0.00 | 0.00 | 0.00 | 0.00 | 0.00 | 0.00 | 0 | — |
| | Gradation part 12Da | Length of gradation part (L2) mm | 90 | 92 | 88 | 90 | 40 | 90 | 92 | — |
| | | Maximum value of thickness of first resin layers (T1 + T2) mm | 0.78 | 0.79 | 0.79 | 0.78 | 0.78 | 0.78 | 0.79 | — |
| | | Minimum value of thickness of first resin layers (T1 + T2) mm | 0.77 | 0.79 | 0.70 | 0.77 | 0.77 | 0.77 | 0.76 | — |
| | | Evaluation of color irregularity of gradation: visual observation | ⊚ | ⊚ | ⊚ | ⊚ | ⊚ | ⊚ | ○ | — |
| | | Evaluation of color irregularity of gradation: transmittance measurement | ○ | ○ | ○ | ○ | ○ | ○ | ○ | — |

TABLE 4-continued

| | | | Ex. 19 | Ex. 20 | Ex. 21 | Ex. 22 | Ex. 23 | Ex. 24 | Ex. 25 | Comp. Ex. 5 |
|---|---|---|---|---|---|---|---|---|---|---|
| Dark color part 11D | Minimum value of parallel light transmittance | % | 1.1 | 1.1 | 1.0 | 1.1 | 1.1 | 1.1 | 1.1 | 32.0 |
| | Minimum value of total light transmittance | % | 61.0 | 62.0 | 60.0 | 61.0 | 61.0 | 61.0 | 62.0 | 84.5 |
| | Length of dark color part (L1) | mm | 1000 | 1000 | 1000 | 1800 | 1800 | 610 | 1000 | — |
| | Maximum value of thickness of first resin layers (T1 + T2) | mm | 0.77 | 0.79 | 0.70 | 0.77 | 0.77 | 0.77 | 0.76 | 0.54 |
| | Minimum value of thickness of first resin layers (T1 + T2) | mm | 0.52 | 0.71 | 0.21 | 0.52 | 0.52 | 0.52 | 0.68 | 0.47 |
| | Maximum value of thickness of second resin layer (T3) | mm | 0.29 | 0.11 | 0.60 | 0.29 | 0.29 | 0.29 | 0.11 | 0.29 |
| | Minimum value of thickness of second resin layer (T3) | mm | 0.045 | 0.017 | 0.092 | 0.045 | 0.045 | 0.045 | 0.017 | — |
| Gradation part 12Db | Length of gradation part (L2) | mm | 90 | 92 | 88 | 90 | 130 | 90 | 92 | — |
| | Maximum value of thickness of first resin layers (T1 + T2) | mm | 0.78 | 0.79 | 0.79 | 0.78 | 0.78 | 0.78 | 0.79 | — |
| | Minimum value of thickness of first resin layers (T1 + T2) | mm | 0.77 | 0.79 | 0.70 | 0.77 | 0.77 | 0.77 | 0.76 | — |
| | Evaluation of color irregularity of gradation: visual observation | | ○○ | ○○ | ○○ | ○○ | ○○ | ○○ | ○ | — |
| | Evaluation of color irregularity of gradation: transmittance measurement | | ○ | ○ | ○ | ○ | ○ | ○ | ○ | — |
| Transparent part 13Db | Maximum value of parallel light transmittance | % | 78.5 | 78.5 | 78.5 | 78.5 | 78.5 | 78.5 | 78.5 | 78.5 |
| | Maximum value of total light transmittance | % | 88.5 | 88.5 | 88.5 | 88.5 | 88.5 | 88.5 | 88.5 | 88.5 |
| | Length of transparent part (L3) | mm | 900 | 900 | 900 | 500 | 500 | 1400 | 900 | 1900 |
| | Maximum value of thickness of first resin layers (T1 + T2) | mm | 0.82 | 0.82 | 0.82 | 0.82 | 0.82 | 0.82 | 0.82 | 0.82 |
| | Minimum value of thickness of first resin layers (T1 + T2) | mm | 0.79 | 0.79 | 0.78 | 0.79 | 0.79 | 0.79 | 0.79 | 0.75 |
| | Maximum value of thickness of second resin layer (T3) | mm | 0.015 | 0.006 | 0.030 | 0.015 | 0.015 | 0.015 | 0.006 | — |
| | Minimum value of thickness of second resin layer (T3) | mm | 0.00 | 0.00 | 0.00 | 0.00 | 0.00 | 0.00 | 0.00 | — |
| Evaluation of parallel light transmittance of laminated glass | | | ○ | ○ | ○ | ○ | ○ | ○ | ○ | × |

TABLE 5

| | | | | Ex. 26 |
|---|---|---|---|---|
| Ingredients to be blended | Second resin layer A (first surface layer) | Thermoplastic resin | Parts by mass | 100 |
| | | Plasticizer | Parts by mass | 40 |
| | | Calcium carbonate | % by mass | 0.45 |
| | First resin layer (intermediate layer) | Thermoplastic resin | Parts by mass | 100 |
| | | Plasticizer | Parts by mass | 39 |
| | | Calcium carbonate | % by mass | 0 |
| | Second resin layer B (second surface layer) | Thermoplastic resin | Parts by mass | 100 |
| | | Plasticizer | Parts by mass | 40 |
| | | Calcium carbonate | % by mass | 0.45 |
| Area density of the thinnest portion of respective first resin layers A, B | | | Area density g/m² | 0.8 |
| Area density of the thickest portion of respective first resin layers A, B | | | Area density g/m² | 3.8 |
| Complex viscosity η 1 of respective first resin layers A, B | | | Pa · s | 7800 |
| Complex viscosity η 2 of second resin layer | | | Pa · s | 7420 |
| Complex viscosity ratio (η 2/η 1) | | | | 0.95 |
| Evaluation | Shape of interlayer film | | | FIG. 7 |
| | Dark color part 11X | Minimum value of parallel light transmittance | % | 25.0 |
| | | Minimum value of total light transmittance | % | 83.7 |
| | | Length of dark color part (L1) | mm | 1900 |
| | | Maximum value of thickness of second resin layers (T4 + T5) | mm | 0.79 |
| | | Minimum value of thickness of second resin layers (T4 + T5) | mm | 0.66 |
| | | Maximum value of thickness of first resin layer (T6) | mm | 0.13 |
| | | Minimum value of thickness of first resin layer (T6) | mm | 0.00 |
| | Gradation part 12X | Length of gradation part (L2) | mm | 200 |
| | | Maximum value of thickness of second resin layers (T4 + T5) | mm | 0.66 |
| | | Minimum value of thickness of second resin layers (T4 + T5) | mm | 0.217 |
| | | Evaluation of color irregularity of gradation: visual observation | | ∘∘ |
| | | Evaluation of color irregularity of gradation: transmittance measurement | | ∘ |
| | | Maximum value of thickness of first resin layer (T6) | mm | 0.573 |
| | | Minimum value of thickness of first resin layer (T6) | mm | 0.130 |
| | Transparent part 13X | Maximum value of parallel light transmittance | % | 65 |
| | | Maximum value of total light transmittance | % | 87.5 |
| | | Length of transparent part (L3) | mm | 500 |
| | | Maximum value of thickness of second resin layers (T4 + T5) | mm | 0.217 |
| | | Minimum value of thickness of second resin layers (T4 + T5) | mm | 0.170 |
| | | Maximum value of thickness of first resin layer (T6) | mm | 0.620 |
| | | Minimum value of thickness of first resin layer (T6) | mm | 0.573 |
| | Evaluation of parallel light transmittance of laminated glass | | | ∘ |

EXPLANATION OF SYMBOLS 1, 1A, 1B, 1C, 1D, 1E, 1X, 1Y: Interlayer film
11, 11A, 11B, 11Ca, 11Cb, 11D, 11E, 11X, 11Y: Dark color part
12, 12A, 12B, 12Ca, 12Cb, 12Da, 12Db, 12E, 12X, 12Y: Gradation part
13, 13A, 13B, 13C, 13Da, 13Db, 13E, 13X, 13Y: Transparent part
16, 16A, 16B, 16C, 16D, 16X, 16Y: First resin layer
17, 17A, 17B, 17C, 17D, 17X, 17Y: Second resin layer
18: Third resin layer
21: Laminated glass
22: First laminated glass member
23: Second laminated glass member
51, 51X: Interlayer film
61, 61X: Dark color part
62, 62X: Gradation part
63, 63X: Transparent part
66, 66X: First resin layer
67, 67X: Second resin layer

The invention claimed is:

1. An interlayer film for laminated glass, being provided with a dark color part, a gradation part and a transparent part, the dark color part, the gradation part and the transparent part being arranged side by side in a direction orthogonal to a thickness direction of the interlayer film in this order, allowing laminated glass to have a parallel light transmittance in a portion of the dark color part less than or equal to 30% at the time of preparing the laminated glass with two sheets of clear glass in accordance with JIS R3202 (1996), allowing the parallel light transmittance in a portion of the gradation part of the laminated glass to be continuously increased from the dark color part side to the transparent part side, and allowing the laminated glass to have a parallel light transmittance in a portion of the transparent part greater than or equal to 60%, comprising the following first configuration or comprising the following second configuration:

The first configuration: Each of the dark color part, the gradation part and the transparent part has a first resin layer containing a thermoplastic resin and a plasticizer, each of the dark color part and the gradation part further has a second resin layer being embedded in the first resin layer so as to allow the first resin layer to be situated on surfaces at both sides in the thickness direction and containing a thermoplastic resin, a plasticizer and inorganic particles, and the thickness of the second resin layer in the gradation part is continuously decreased from the dark color part side to the transparent part side so as to allow the parallel light transmittance in a portion of the gradation part of the laminated glass to be continuously increased from the dark color part side to the transparent part side;

The second configuration: Each of the dark color part, the gradation part and the transparent part has a second resin layer containing a thermoplastic resin, a plasticizer and inorganic particles, each of the gradation part and the transparent part further has a first resin layer being embedded in the second resin layer so as to allow the second resin layer to be situated on surfaces at both sides in the thickness direction and containing a thermoplastic resin and a plasticizer, and the total thickness of the second resin layers in the gradation part is continuously decreased from the dark color part side to the transparent part side so as to allow the parallel light transmittance in a portion of the gradation part of the laminated glass to be continuously increased from the dark color part side to the transparent part side.

2. The interlayer film for laminated glass according to claim 1, wherein the interlayer film comprises the first configuration.

3. The interlayer film for laminated glass according to claim 1, wherein the interlayer film comprises the second configuration.

4. The interlayer film for laminated glass according to claim 1, wherein a complex viscosity at 200° C. of the second resin layer is greater than or equal to 0.7 times and less than or equal to 2 times a complex viscosity at 200° C. of the first resin layer.

5. The interlayer film for laminated glass according to claim 1, wherein a minimum value of the parallel light transmittance in a portion of the dark color part of the laminated glass is less than or equal to 10%.

6. The interlayer film for laminated glass according to claim 1, wherein a minimum value of the total light transmittance in a portion of the dark color part of the laminated glass is greater than or equal to 50%.

7. The interlayer film for laminated glass according to claim 1, wherein a length of the dark color part is greater than or equal to 200 mm.

8. The interlayer film for laminated glass according to claim 1, wherein a content of the inorganic particles is greater than or equal to 2% by mass in 100% by mass of the second resin layer.

9. A laminated glass, comprising
a first laminated glass member,
a second laminated glass member and
the interlayer film for laminated glass according to claim 1,
wherein the interlayer film for laminated glass is arranged between the first laminated glass member and the second laminated glass member.

10. The laminated glass according to claim 9, wherein a complex viscosity at 200° C. of the second resin layer is greater than or equal to 0.7 times and less than or equal to 2 times a complex viscosity at 200° C. of the first resin layer.

* * * * *